(12) United States Patent
Pard

(10) Patent No.: US 10,875,605 B2
(45) Date of Patent: Dec. 29, 2020

(54) DRIVE TRACK AND DRIVE SPROCKET FOR A VEHICLE

(71) Applicant: BOMBARDIER RECREATIONAL PRODUCTS INC., Valcourt (CA)

(72) Inventor: Jean-Sebastien Pard, Tingwick (CA)

(73) Assignee: BOMBARDIER RECREATIONAL PRODUCTS INC., Valcourt (CA)

(*) Notice: Subject to any disclaimer, the term of this patent is extended or adjusted under 35 U.S.C. 154(b) by 123 days.

(21) Appl. No.: 15/782,297

(22) Filed: Oct. 12, 2017

(65) Prior Publication Data

US 2018/0029669 A1    Feb. 1, 2018

Related U.S. Application Data

(63) Continuation of application No. 14/867,707, filed on Sep. 28, 2015, now Pat. No. 9,828,065, which is a
(Continued)

(51) Int. Cl.
| | |
|---|---|
| *B62M 27/02* | (2006.01) |
| *B62D 55/24* | (2006.01) |
| *B62D 55/26* | (2006.01) |
| *B62D 55/07* | (2006.01) |
| *B62D 55/125* | (2006.01) |

(52) U.S. Cl.
CPC ............. *B62M 27/02* (2013.01); *B62D 55/24* (2013.01); *B62D 55/244* (2013.01); *B62D 55/26* (2013.01);
(Continued)

(58) Field of Classification Search
CPC . B62M 27/02; B62M 2027/027; B62D 55/26; B62D 55/24; B62D 55/244; B62D 55/07; B62D 55/125
(Continued)

(56) References Cited

U.S. PATENT DOCUMENTS 3,853,192 A * 12/1974 Husted ................... A63C 5/085
                                                   180/181
4,035,035 A * 7/1977 Husted ................... B62D 55/07
                                                   180/181
(Continued)

FOREIGN PATENT DOCUMENTS

| CA | 2844350 A1 | 8/2015 |
|---|---|---|
| WO | 2015120544 A1 | 8/2015 |

OTHER PUBLICATIONS

International Search Report of PCT/IB2014/060283; dated Sep. 18, 2014; Blaine R. Copenheaver.
(Continued)

*Primary Examiner* — Tony H Winner
*Assistant Examiner* — Felicia L. Brittman
(74) *Attorney, Agent, or Firm* — BCF LLP

(57) ABSTRACT

A snowmobile includes a frame; a suspension assembly; an engine; a drive axle and a drive sprocket and drive track assembly of a tracked vehicle. The drive sprocket includes a wheel mounted on the drive axle, the wheel having a wheel radius; and a plurality of teeth being distributed on a periphery of the wheel, the drive track connected by the suspension assembly, the drive sprocket driving the drive track about the suspension assembly to propel the tracked vehicle. The drive track includes an endless belt having an inner and an outer surface, the belt defining a longitudinal direction and a lateral direction; and external lugs projecting outwards from the outer surface of the belt, each of the external lugs having a height in a direction normal to the outer surface, the wheel radius being smaller than the height of at least some of the external lugs.

17 Claims, 23 Drawing Sheets

Related U.S. Application Data continuation of application No. PCT/IB2014/060283, filed on Mar. 28, 2014.

(60) Provisional application No. 61/806,363, filed on Mar. 28, 2013.

(52) U.S. Cl.
CPC ............ *B62D 55/07* (2013.01); *B62D 55/125* (2013.01); *B62M 2027/027* (2013.01)

(58) Field of Classification Search
USPC ........................................................ 180/193
See application file for complete search history.

(56) References Cited

U.S. PATENT DOCUMENTS

| | | | | |
|---|---|---|---|---|
| 4,244,436 | A * | 1/1981 | Condon | B62M 27/02 180/191 |
| 6,595,812 | B1 * | 7/2003 | Haney | B60F 3/0015 114/360 |
| 6,976,742 | B2 | 12/2005 | Girard et al. | |
| 7,597,167 | B2 | 10/2009 | Kubota | |
| 8,012,050 | B2 | 9/2011 | Aitcin et al. | |
| 2004/0159510 | A1 | 8/2004 | Bergman et al. | |
| 2009/0152037 | A1 * | 6/2009 | Brazier | A63C 5/03 180/191 |
| 2011/0120793 | A1 * | 5/2011 | Lucarelli | B62M 27/02 180/193 |
| 2012/0193979 | A1 | 8/2012 | Pard | |
| 2013/0032417 | A1 * | 2/2013 | Sampson | B62M 27/02 180/182 |

OTHER PUBLICATIONS

Camoplast Inc.; Revive Your Ride—Snowmobile Tracks; brochure; Jul. 2011; First page, p. 37 and last page; Canada.

Snowmobile.com, Make Your Snowmobile Powder-Worthy, Oct. 6, 2008, retrieved from http://www.snowmobile.com/how-to/make-your-snowmobile-powder-worthy-737.html on Oct. 10, 2017.

\* cited by examiner

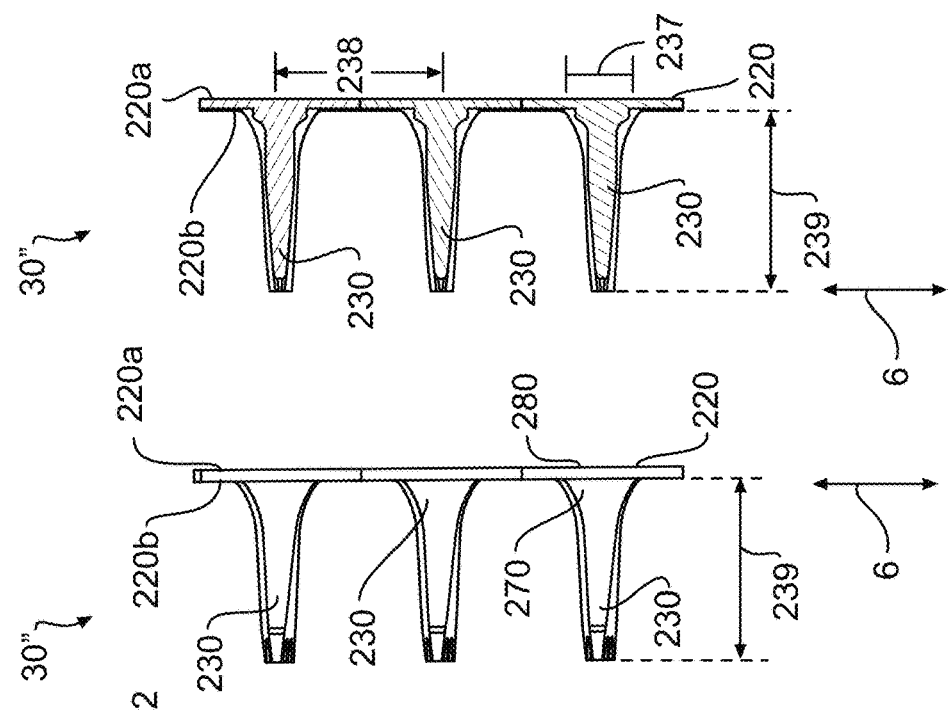
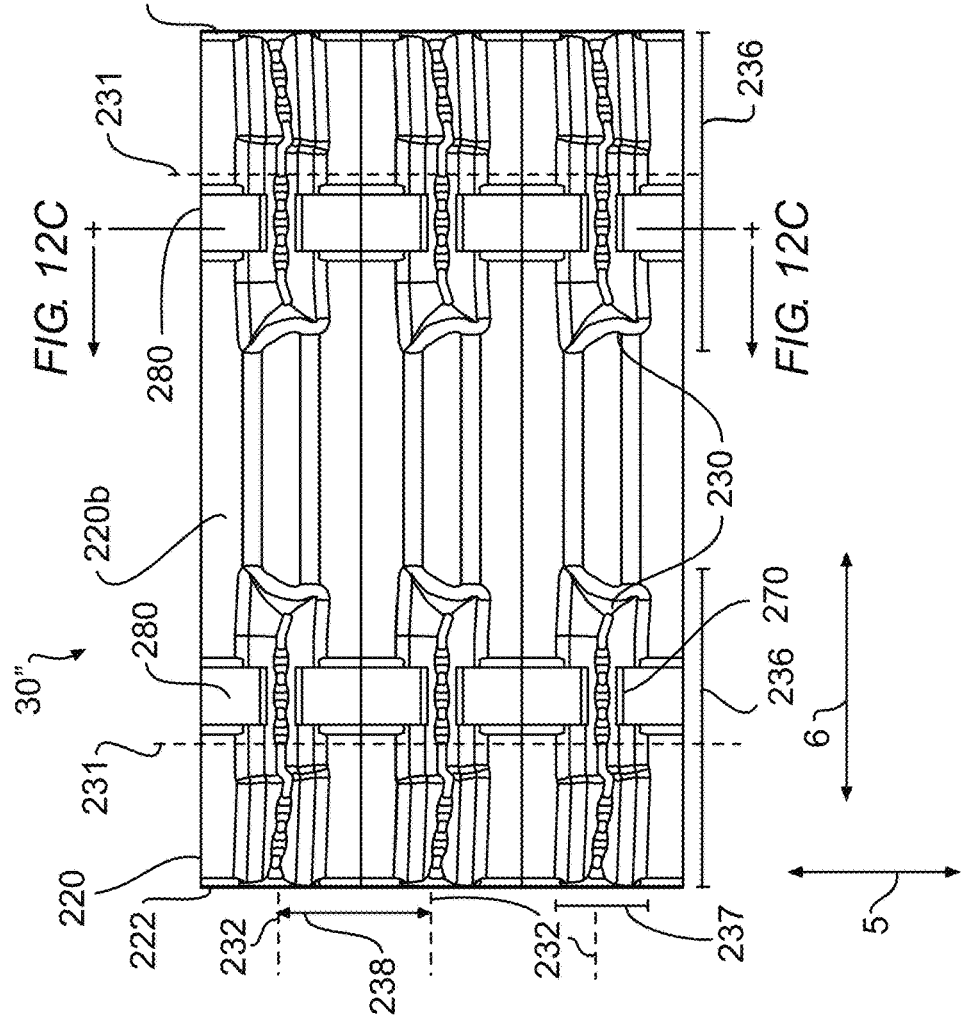
FIG. 12C
FIG. 12B
FIG. 12A

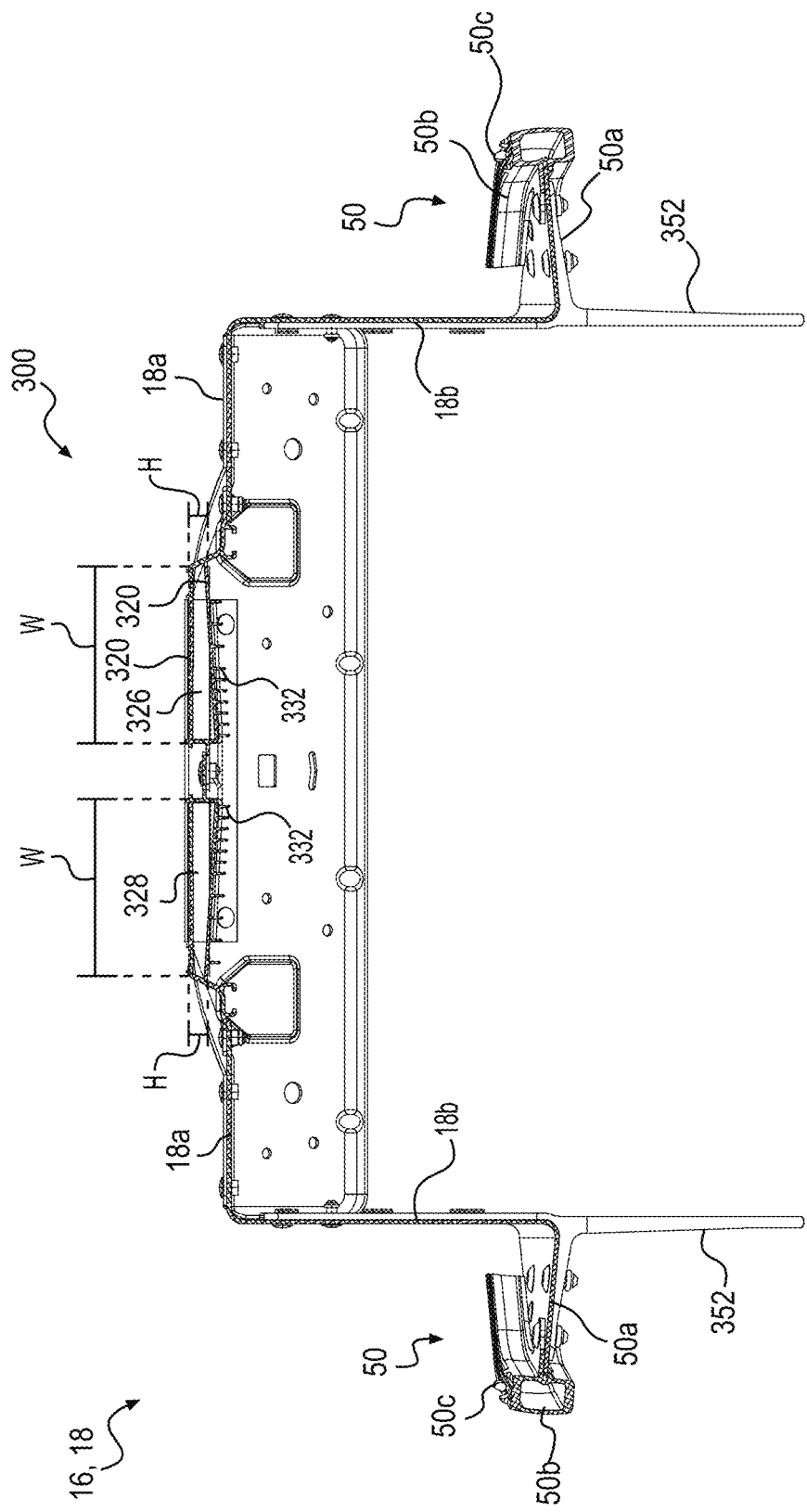

DRIVE TRACK AND DRIVE SPROCKET FOR A VEHICLE

CROSS-REFERENCE

The present application is a continuation of U.S. patent application Ser. No. 14/867,707 filed on Sep. 28, 2015, which is a continuation of International Patent Application No. PCT/IB2014/060283 filed on Mar. 28, 2014, which claims priority to U.S. Provisional Patent Application No. 61/806,363 filed on Mar. 28, 2013, the entirety of each of which is incorporated herein by reference.

FIELD OF THE TECHNOLOGY

The present technology relates to endless drive tracks and drive sprockets for vehicles.

BACKGROUND

Vehicles such as snowmobiles are provided with endless drive tracks to enable traveling over surfaces such as snow, ice and mud. The endless drive tracks are driven by the vehicle's engine via one or more sprockets which engage the endless drive tracks to move the drive tracks and thereby propel the vehicle. Traction between the drive tracks and the ground enables the snowmobile to travel on soft-snow covered surfaces.

Although current drive tracks provide adequate traction, it would be desirable to have an endless drive track for a vehicle that can provide greater traction in soft surfaces such as snow.

SUMMARY

In one aspect of the present technology, there is provided a snowmobile. The snowmobile includes a frame; a suspension assembly connected to the frame; an engine connected to the frame; a drive axle operatively connected to the engine; at least one drive sprocket mounted on the drive axle and being rotatable therewith, each of the at least one drive sprocket including a wheel mounted on the drive axle, the wheel having a wheel radius; and a plurality of teeth being distributed on a periphery of the wheel; and a drive track connected to the frame by the suspension assembly, the at least one drive sprocket driving the drive track about the suspension assembly to propel the snowmobile. The drive track includes an endless belt having an inner surface and an outer surface, the belt defining a longitudinal direction and a lateral direction; and a plurality of external lugs projecting outwards from the outer surface of the belt, each of the plurality of external lugs having a height in a direction normal to the outer surface, the wheel radius being smaller than the height of at least some of the plurality of external lugs.

In some implementations, the snowmobile further includes a plurality of internal lugs projecting inwards from the inner surface of the belt, each of the plurality of teeth being adapted to selectively engage at least some of the plurality of internal lugs.

In some implementations, the wheel of the drive sprocket has a diameter such that the plurality of teeth engages at least three of the plurality of internal lugs.

In some implementations, the plurality of teeth includes a plurality of axial teeth being distributed on a periphery of an axial surface of the wheel and extending therefrom in an axial direction of the drive axle.

In some implementations, the height of the at least some of the plurality of external lugs is greater than a radius of a cylinder circumscribing the plurality of axial teeth.

In some implementations, the plurality of teeth comprises a plurality of radial teeth distributed on a perimetrical surface of the wheel and extending radially therefrom; and the drive track comprises a plurality of belt apertures extending through the belt from the inner surface to the outer surface, each of the plurality of radial teeth selectively engages a corresponding belt aperture when a surface of the wheel adjacent to the corresponding radial tooth is in contact with the inner surface adjacent the corresponding belt aperture.

In some implementations, the snowmobile further includes a brake disk mounted on the drive axle, the brake disk being coaxial and rotatable with the drive axle, a diameter of a cylinder circumscribing the entirety of the brake disk being greater than a diameter of a cylinder circumscribing the entirety of the wheel of the at least one drive sprocket.

In some implementations, the diameter of the brake disk is greater than a diameter of a cylinder circumscribing the entirety of the at least one drive sprocket.

In some implementations, the frame includes a tunnel; the tunnel comprises a left side wall defining a left opening and a right side wall defining a right opening; the drive axle extends through the left opening and the right opening; and the drive axle and the at least one drive sprocket mounted thereon are rotatable about a drive sprocket axis. The snowmobile further includes a left footrest extending laterally outwardly from the left side wall, a portion of the left footrest being disposed longitudinally forwardly of the drive sprocket axis, a projection of the left footrest on the left side wall being disposed in part within a perimeter of the left opening; and a right footrest extending laterally outwardly from the right side wall, a portion of the right footrest being disposed longitudinally forwardly of the drive sprocket axis, a projection of the right footrest on the right side wall being disposed in part within a perimeter of the right opening.

In some implementations, the suspension assembly is a rear suspension assembly, the rear suspension assembly comprising an upper idler wheel rotatable about an upper idler wheel rotation axis; the drive axle and the at least one drive sprocket mounted thereon are rotatable about a drive sprocket axis. The snowmobile further includes a left ski assembly; a right ski assembly; a left front suspension assembly connecting the left ski assembly to the frame; and a right front suspension assembly connecting the right ski assembly to the frame, each of the left and right front suspension assemblies comprising an arm having a front member and a rear member, respective inner ends of each of the front and rear members being pivotally connected to the frame about an arm pivot axis. For each of the left and right suspension assemblies, an intersection of the arm pivot axis with a plane containing the upper idler wheel rotation axis and the drive sprocket axis is disposed longitudinally between the inner ends of the front member and the rear member.

In some implementations, the arm is a lower arm; and each of the left and right front suspension assemblies further includes an upper arm.

In one aspect of the present technology, there is provided a drive sprocket and drive track assembly of a tracked vehicle. The assembly includes a drive track including an endless belt having an inner surface and an outer surface, the belt defining a longitudinal direction and a lateral direction; and a plurality of external lugs projecting outwards from the outer surface of the belt, each of the plurality of external lugs having a height in a direction normal to the outer surface; and a plurality of internal lugs projecting inwards from the inner surface of the belt; and at least one drive sprocket. Each of the at least one drive sprocket includes a wheel mounted on the drive axle, the wheel having a wheel radius, the radius being smaller than the height of at least some of the plurality of external lugs; and a plurality of teeth being distributed on a periphery of the wheel, each of the plurality of teeth being adapted to engage at least some of the plurality of internal lugs.

In some implementations, the sprocket has a diameter such that the plurality of teeth engages at least three of the plurality of internal lugs.

In some implementations, the plurality of teeth comprises a plurality of axial teeth being distributed on a periphery of an axial surface of the wheel and extending therefrom in an axial direction of the drive axle; and the height of the at least some of the plurality of external lugs is greater than a radius of a cylinder circumscribing the plurality of axial teeth.

In some implementations, the assembly further includes a brake disk mounted on the drive axle, the brake disk being coaxial and rotatable with the drive axle, a diameter of a cylinder circumscribing the entirety of the brake disk being greater than a diameter of a cylinder circumscribing the entirety of the wheel of the at least one drive sprocket.

In some implementations, the diameter of the brake disk is greater than a diameter of a cylinder circumscribing the entirety of the at least one drive sprocket.

For purposes of the present application, terms related to spatial orientation when referring to a snowmobile and components in relation to the snowmobile, such as "forwardly", "rearwardly", "left", "right", "above" and "below", are as they would be understood by a driver of the snowmobile, with the snowmobile in a straight ahead orientation (i.e. not steered left or right), and in an upright position (i.e. not tilted). When referring to a drive track of the snowmobile alone, terms related to spatial orientation, such as "lateral" and "longitudinal" should be taken with respect to the drive track itself.

Embodiments of the present technology each have at least one of the above-mentioned aspects, but do not necessarily have all of them.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 12A is a top plan view of a portion of a drive track according to yet another embodiment;

FIG. 12B is a right side elevation view of the portion of the drive track of FIG. 12A;

FIG. 12C is a cross-sectional view of the portion of the drive track of FIG. 12A taken along the line C-C of FIG. 12A;

FIG. 15C is a cross-sectional view taken along the line 15C-15C of FIG. 14; and

DETAILED DESCRIPTION

Figure 1:
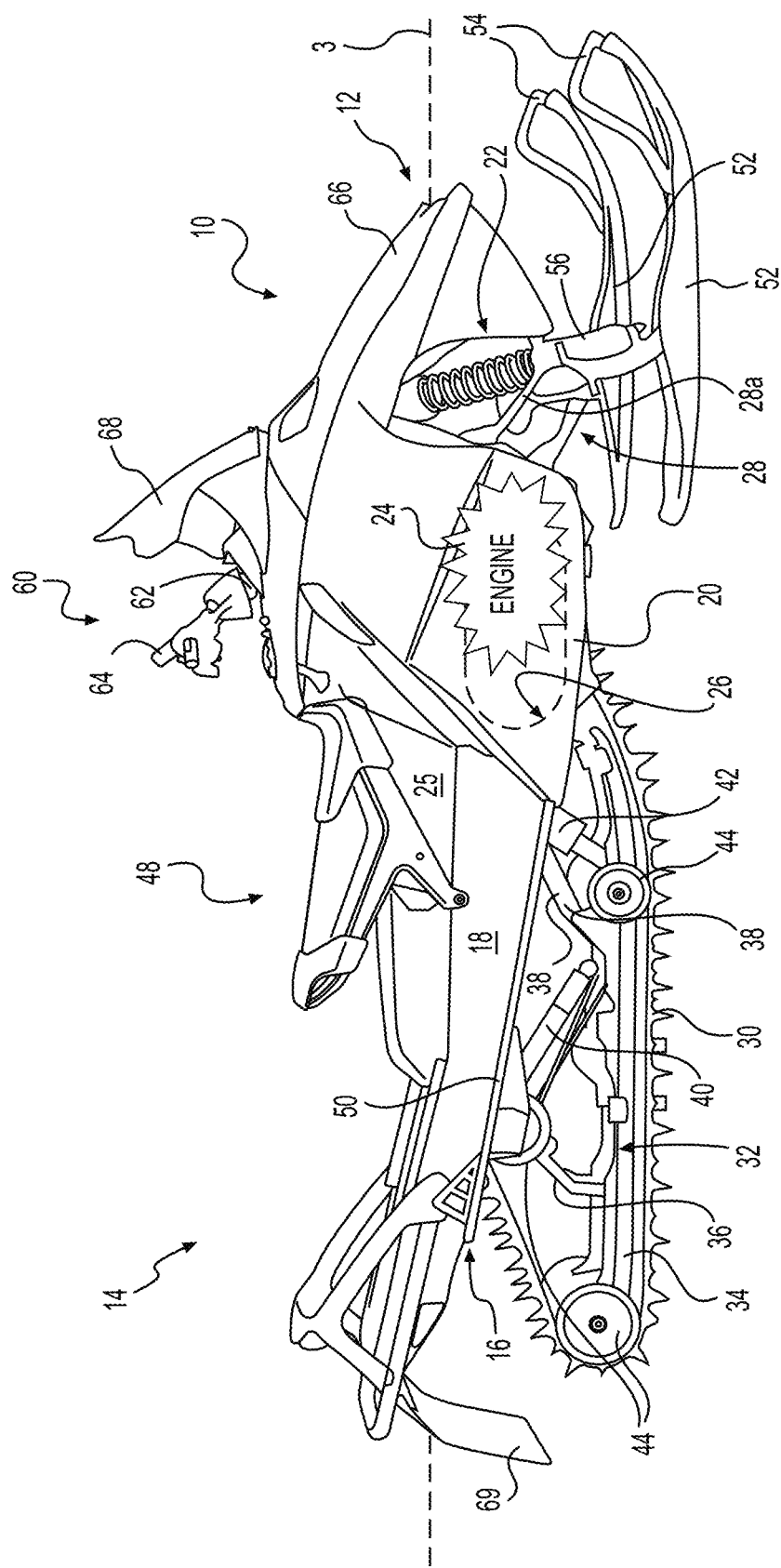
FIG. 1 is a right side elevation view of a snowmobile.

With reference to FIG. 1, a snowmobile 10 will be described. Although a snowmobile 10 is presented herein, it is contemplated that aspects of the present technology could be applied to other types of vehicles having drive tracks for operation on snow or other surfaces.

The snowmobile 10 includes a front end 12 and a rear end 14, which are defined consistently with the forward travel direction of the snowmobile 10.

The snowmobile 10 includes a frame 16. The frame 16 includes a tunnel 18, an engine cradle portion 20, a left front suspension assembly mounting portion and a right front suspension assembly mounting portion 22. An engine 24

(schematically shown) is supported by the engine cradle portion 20. The engine 24 is cooled by coolant circulated through a heat exchanger assembly 300, 400 (FIG. 3, 13), described in greater detail below. The heat exchanger assembly 300, 400 forms part of the tunnel 18.

An endless drive track 30 is positioned under the tunnel 18. The endless drive track 30 is operatively connected to the engine 24 through a belt transmission system 26 (schematically shown) for propelling the snowmobile over the ground. The transmission system 26 is a continuously variable transmission (CVT) but it is contemplated that other types of transmissions could be used. The CVT 26 is disposed on a left side of the engine 24.

The endless drive track 30 is suspended for movement relative to the frame 16, by a rear suspension assembly 32. The rear suspension assembly 32 includes a pair of spaced apart slide rails 34, rear suspension arms 36, 38 and shock absorbers 40, 42. The slide rails 34 engage the inner surface 220a (FIG. 5) of the endless drive track 30, the rear suspension arms 36, 38 and the shock absorbers 40, 42 pivotally connect between the tunnel 18 and the slide rails 34. The endless drive track 30 is driven to run about the rear suspension assembly 32 for propulsion of the snowmobile 10. The rear suspension assembly 32 includes a plurality of idler wheels 44 rotatably supported by the frame 16 which define the path over which the endless drive track 30 travels. The tunnel 18 defines a longitudinal direction 3 (FIG. 3) and a lateral direction 4 (FIG. 3) for the snowmobile 10. A longitudinal centerplane 13 of the snowmobile 10 extends vertically and longitudinally.

A seat 48, disposed on the tunnel 18, supports a rider. A footrest 50 is positioned on each side of the tunnel 18 below the seat 48 to support the rider's feet. The footrests 50 are integrally formed with the tunnel 18. As can be seen best in FIGS. 13 and 16, the left footrest 50 has a portion 50a extending generally horizontally and laterally outwardly from the left side wall 18b of the tunnel 18. A rim 50b extends vertically upwards from the laterally outer edge of the horizontal portion 50a. The upper surface of the rim 50b has a number of spikes 50c projecting upwards therefrom. A vertically and laterally extending wall forms a toehold 51 at the front end of the footrest 50. The toehold 51 extends upwards from the horizontal footrest portion 50a and laterally outwards from the side wall 18b of the tunnel 18. Similarly, the right footrest 50 has a horizontal portion 50a, a vertical rim 50b formed at the laterally outer edge of the horizontal portion 50a, spikes 50c projecting upwards from the upper rim surface, and a toehold 51 extending laterally and vertically from the front end of the horizontal portion 50a. The spikes 50c provide a better grip on the footrest 50 for the driver's foot and help prevent the foot from sliding laterally off the footrest 50. The toehold 51 helps prevent the driver's foot from sliding off the front edge of the footrest 50.

Figure 16:
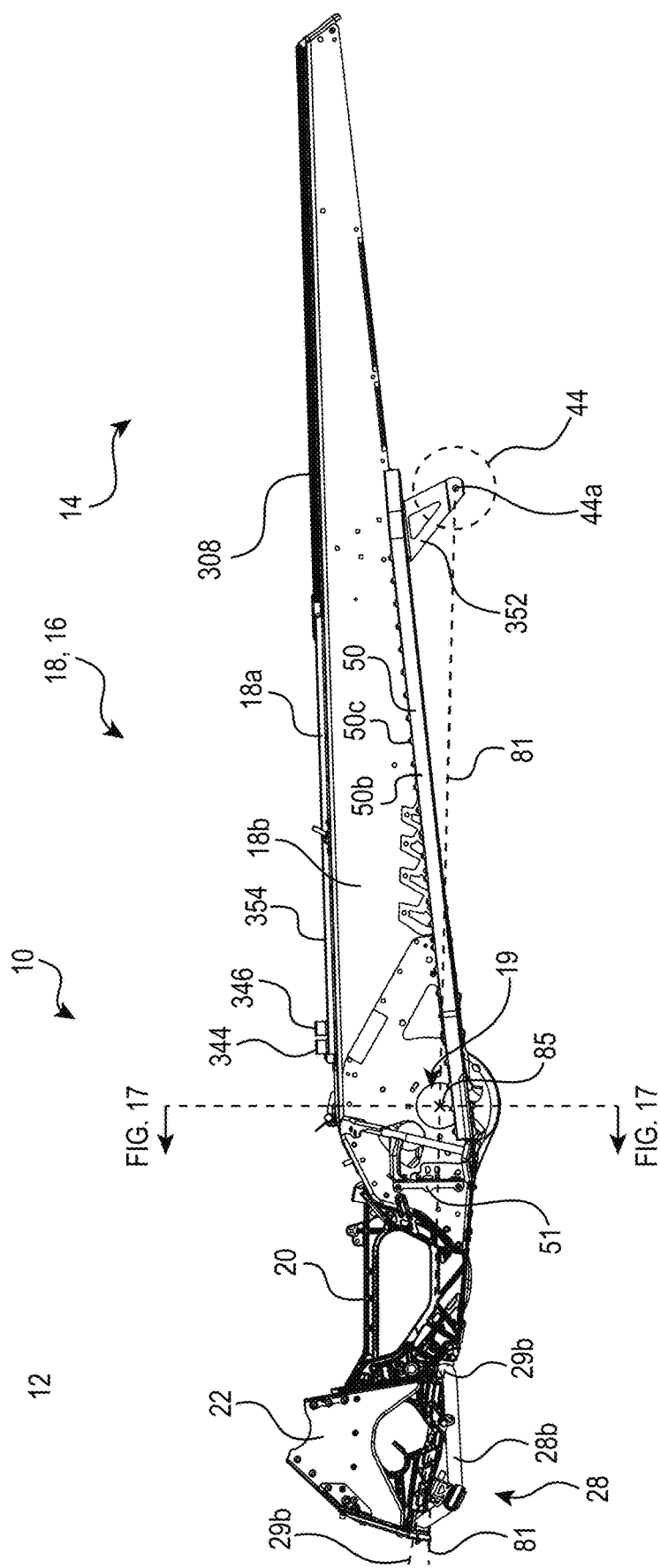
FIG. 16 is a left side elevation view of a portion of a frame and a lower A-arm of the front suspension assembly of the snowmobile of FIG. 1.

Left and right ski assemblies 52 are positioned at the front end 12 of the snowmobile 10. Each ski assembly 52 includes a ski 54 and a corresponding ski leg 56. Each of the left and right ski assemblies 52 is attached to the respective front suspension assembly mounting portion 22 of the frame 16 via a respective front suspension assembly 28. The left front suspension assembly 28 is a mirror image of the right front suspension assembly 28, and therefore, only the left front suspension assembly 28 will be described herein. The left front suspension assembly 28 includes an upper A-arm 28a (FIG. 1) and a lower A-arm 28b (FIG. 16). Each A-arm 28a, 28b has a front member and a rear member that are connected together at their laterally outer ends and longitudinally spaced apart at their laterally inner ends. The outer ends of the front and rear members of the upper A-arm 28a are connected to an upper portion of the left ski leg 56 via a ball joint (not shown). The outer ends of the front and rear members of the lower A-arm 28b are connected to a lower portion of the left ski leg 56 via a ball joint (not shown). The laterally inner ends of the upper A-arm 28a are rotatably connected to the left front suspension assembly mounting portion 22 so as to pivot about a longitudinally extending pivot axis. The laterally inner ends of the lower A-arm 28b are rotatably connected to the left front suspension assembly mounting portion 22 to pivot about a longitudinally extending pivot axis 29b. It is contemplated that other types of front suspension assemblies could be used. It is contemplated that the snowmobile 10 could have only one ski 56 and one ski leg 54.

A steering assembly 60 including a steering column 62 and handlebar 64 is provided. The steering column 62 is attached at its upper end to the handlebar 64, which is positioned forward of the rider and behind the engine 24. The steering column 62 is operatively connected to the ski legs 56 and the skis 54, in order to steer the skis 54, and the snowmobile 10, when the handlebar 64 is turned. It is contemplated that the steering column 62 could be connected to a steering device other than the handlebar 64.

Fairings 66 are provided at the front end 12 of the snowmobile 10. The fairings 66 enclose the engine 24 and the belt transmission system 26, thereby providing an external shell that not only protects the engine 24 and the belt transmission system 26, but also make the snowmobile 10 more aesthetically pleasing. The fairings 66 include a hood and one or more side panels that can be opened to allow access to the engine 24 and the belt transmission system 26 when this is required, for inspection or maintenance of the engine 24 and/or the belt transmission system 26 for example. A windshield 68 is connected to the fairings 66 near the front end 12 of the snowmobile 10. It is contemplated that the windshield 68 could be attached directly to the handlebar 64. The windshield 68 acts as a windscreen to lessen the force of the air on the rider while the snowmobile 10 is moving forward. A snow flap 69 is connected to the tunnel 18 at the rear end 14 of the snowmobile 10 to protect from snow and ice being flung upwards as the snowmobile 10 travels over the ground 2.

Figure 2:
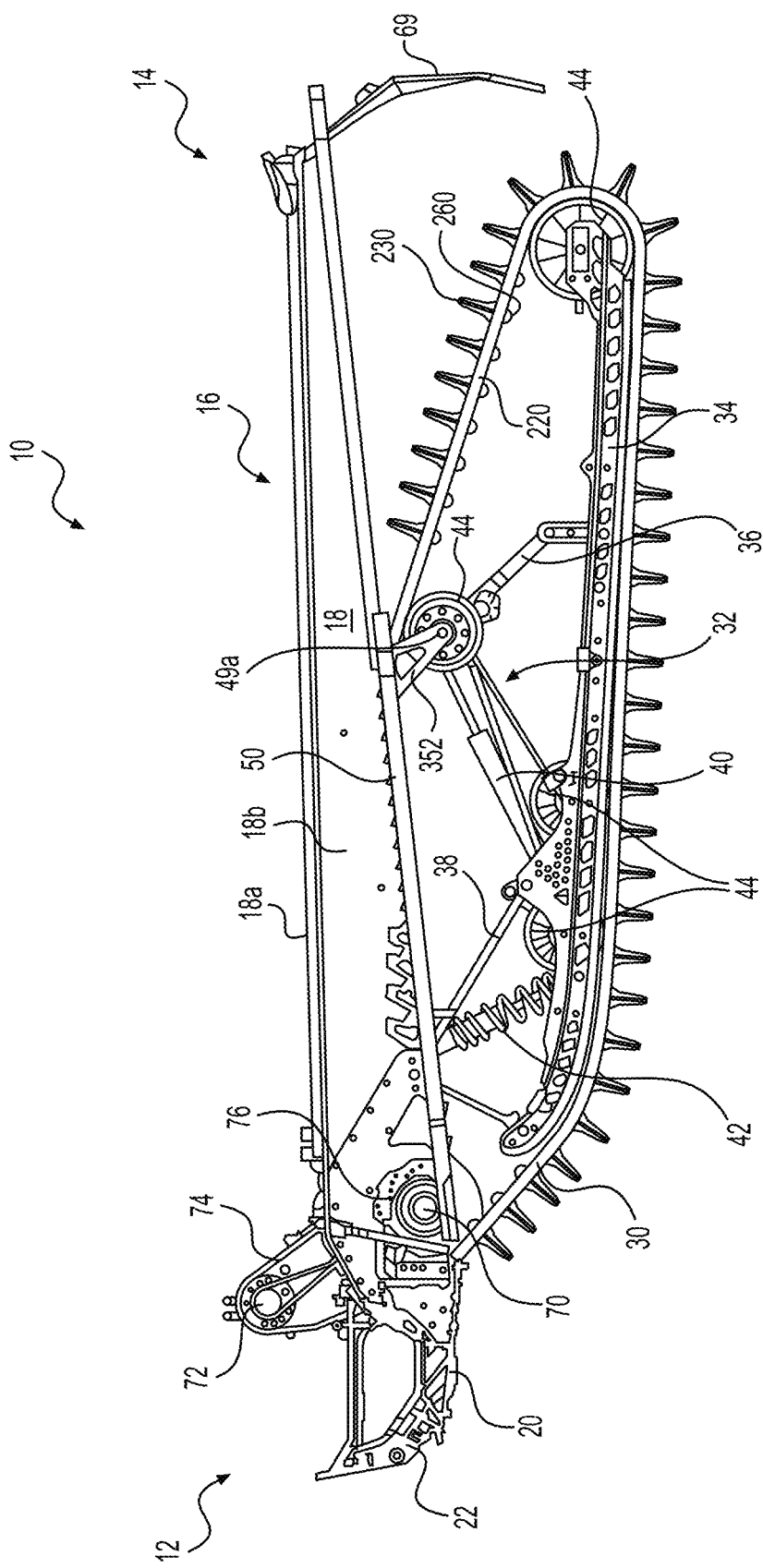
FIG. 2 is a left side elevation view of a portion of the snowmobile of FIG. 1 showing a portion of a frame of the snowmobile, with a drive track connected to the frame by a rear suspension assembly.
Figure 3:
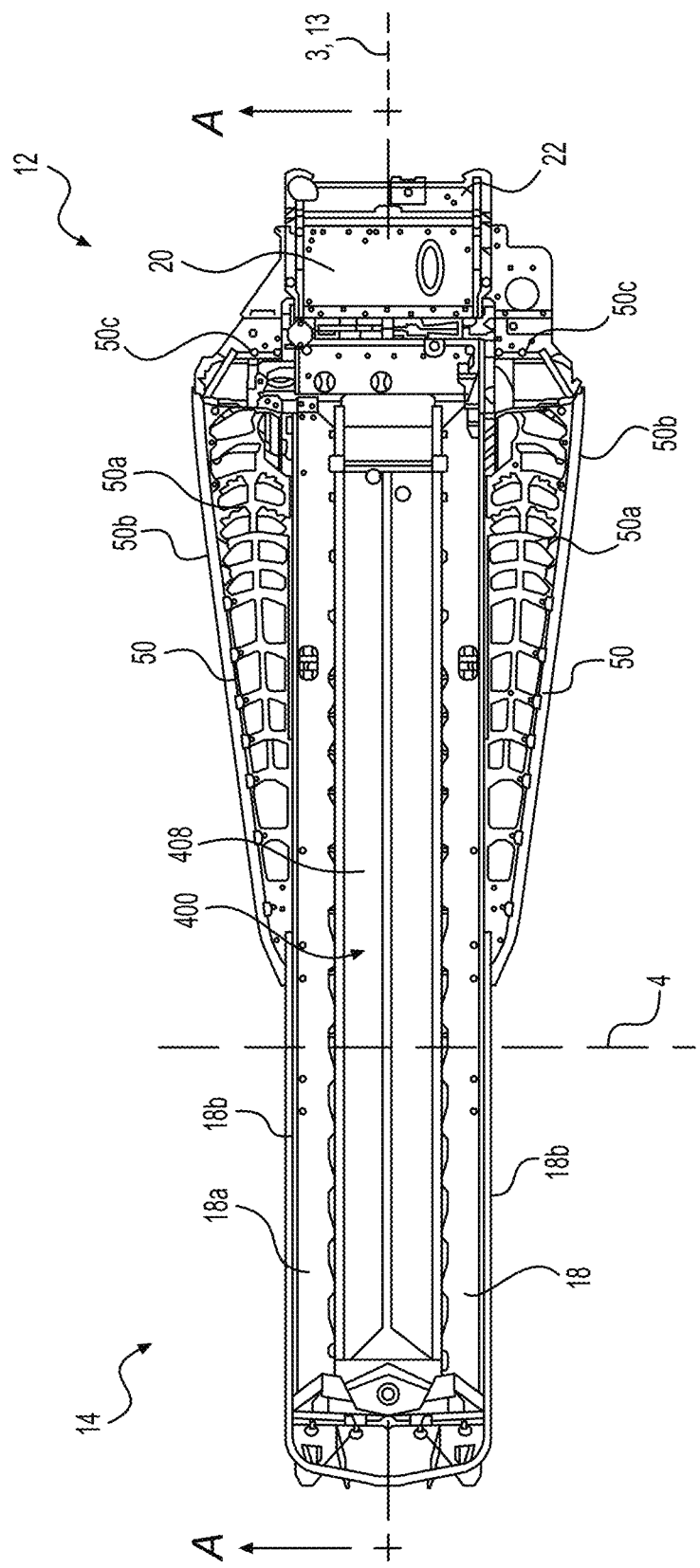
FIG. 3 is a top plan view of the portion of the snowmobile of FIG. 1.
Figure 4:
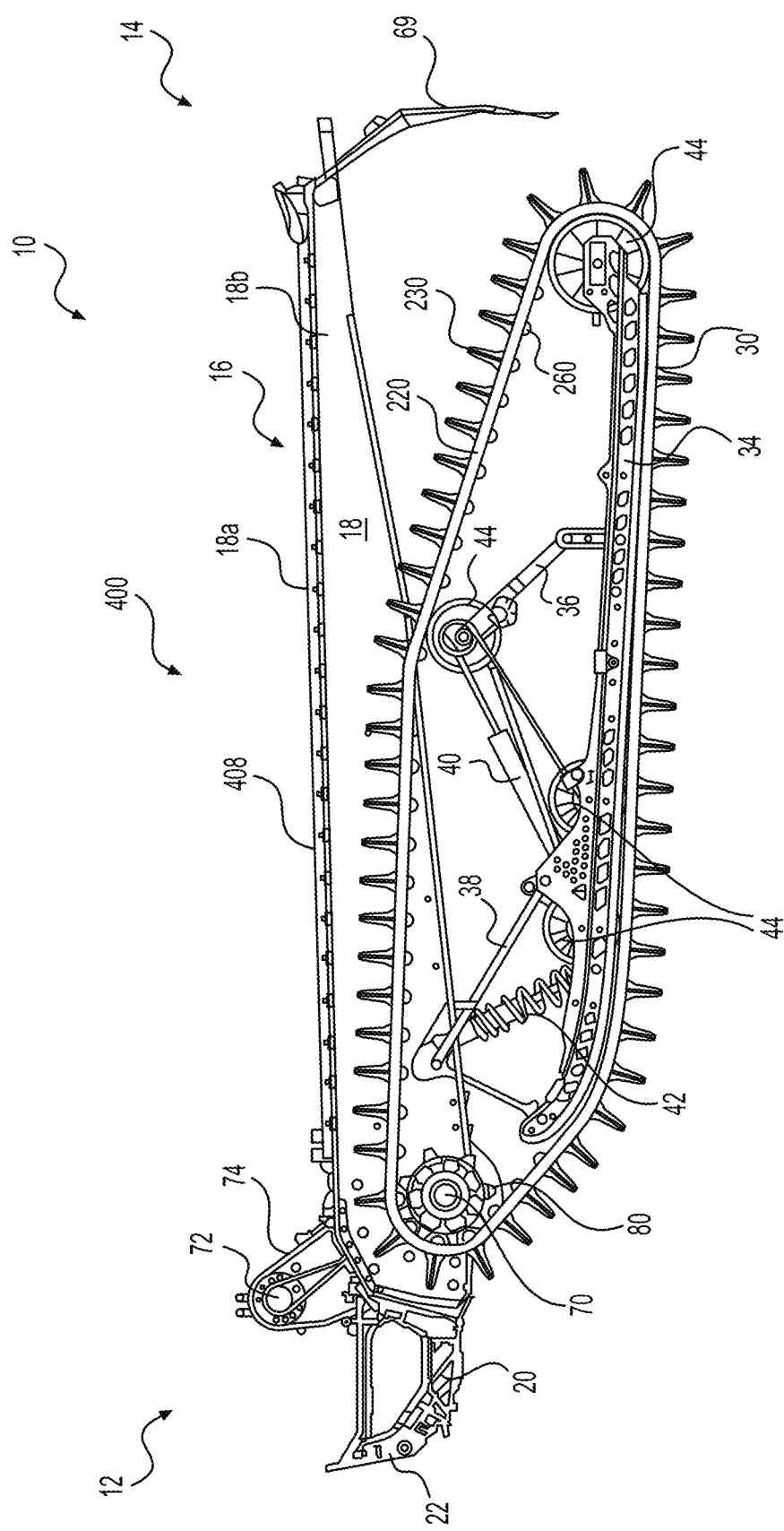
FIG. 4 is a vertical cross-sectional view taken along the line A-A of FIG. 2.

With reference to FIGS. 2 to 4, the endless track 30 is operatively connected to the engine 24 via a drive axle 70 and a fixed ratio reduction drive 74. The CVT 26 is disposed on a left side of the engine 24. The reduction drive 74, disposed on a right side of the engine 24 and the tunnel 18, is connected to the CVT 26 by a transverse jackshaft 72. A driven pulley (not shown) of the CVT 26 is mounted on the left end of the transverse jackshaft 72. An input member of the reduction drive 74 is mounted on the right end of the jackshaft 72. The output member of the reduction drive 74 is mounted on the right end of the drive axle 70. The drive axle 70 is thus rotated by the engine 24.

Figure 5:
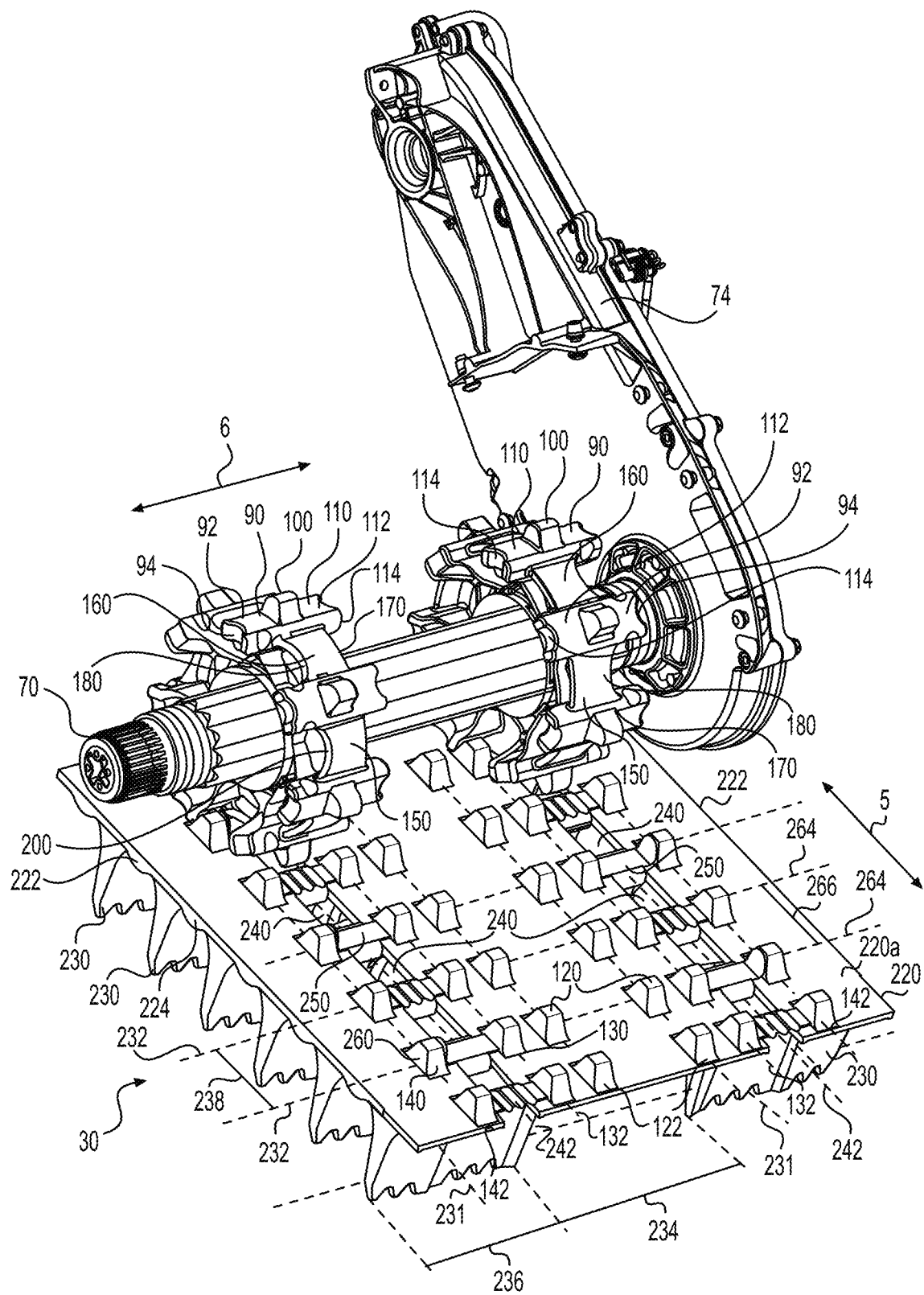
FIG. 5 is a perspective view, taken from a top, rear and left side, of a portion of the snowmobile of FIG. 1 showing a portion of the drive track of FIG. 3 being engaged by a pair of sprockets mounted on a drive axle connected to a reduction drive.

With reference to FIGS. 4 and 5, two drive sprockets 80, including a left drive sprocket 80 and a right drive sprocket 80, are mounted coaxially to the drive axle 70 to be rotated thereby. The drive sprockets 80 and the drive axle 70 rotate about a drive sprocket axis 85. It is contemplated that only one or more than two drive sprockets 80 could be mounted on the drive axle 70. The engine 24 thereby drives the sprockets 80 and the track 30 to propel the snowmobile 10.

Figure 9:
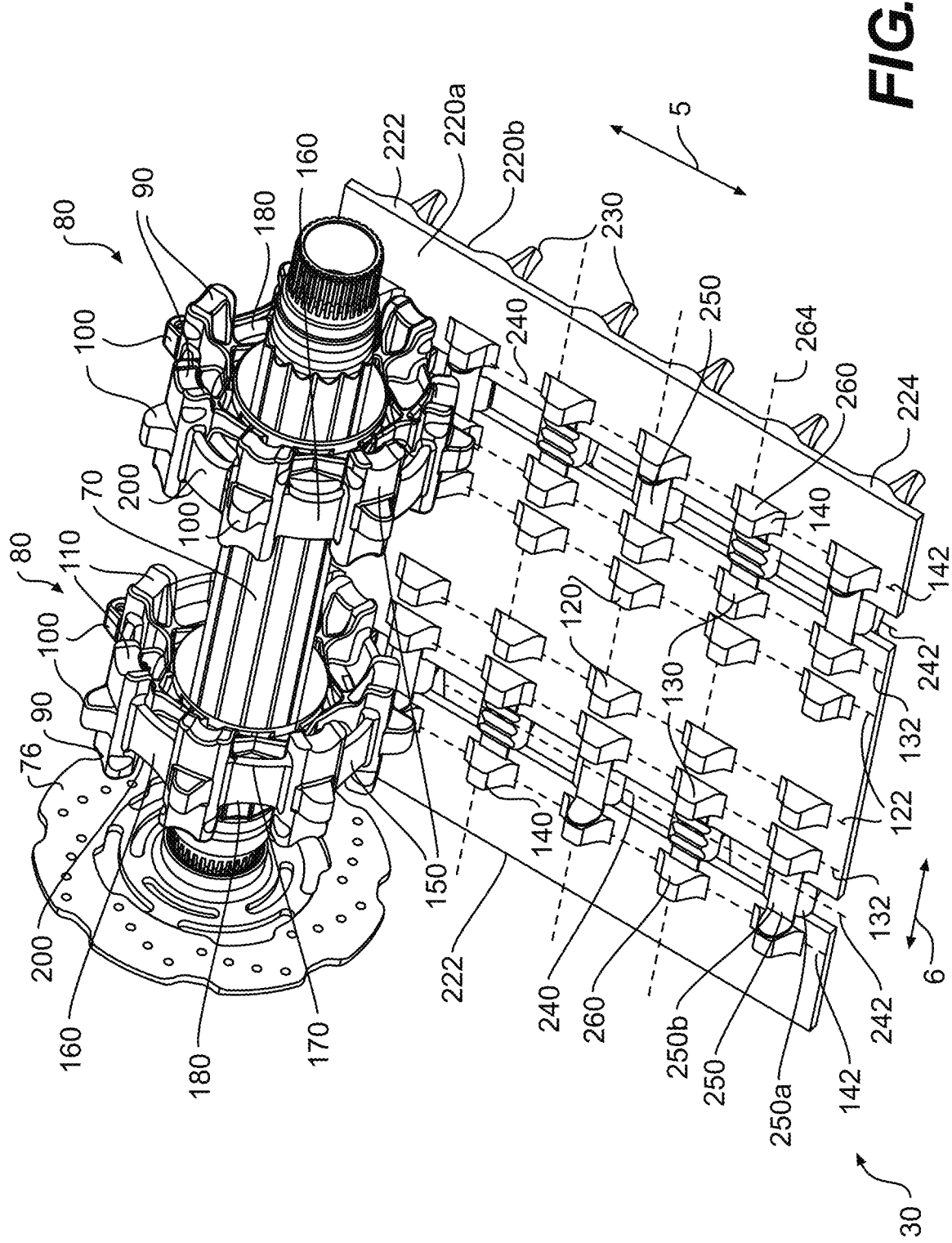
FIG. 9 is a perspective view taken from a top, right and rear side, of the snowmobile portion of FIG. 5 showing a brake disc mounted on the drive axle with the reduction gear removed for clarity.
Figure 10:
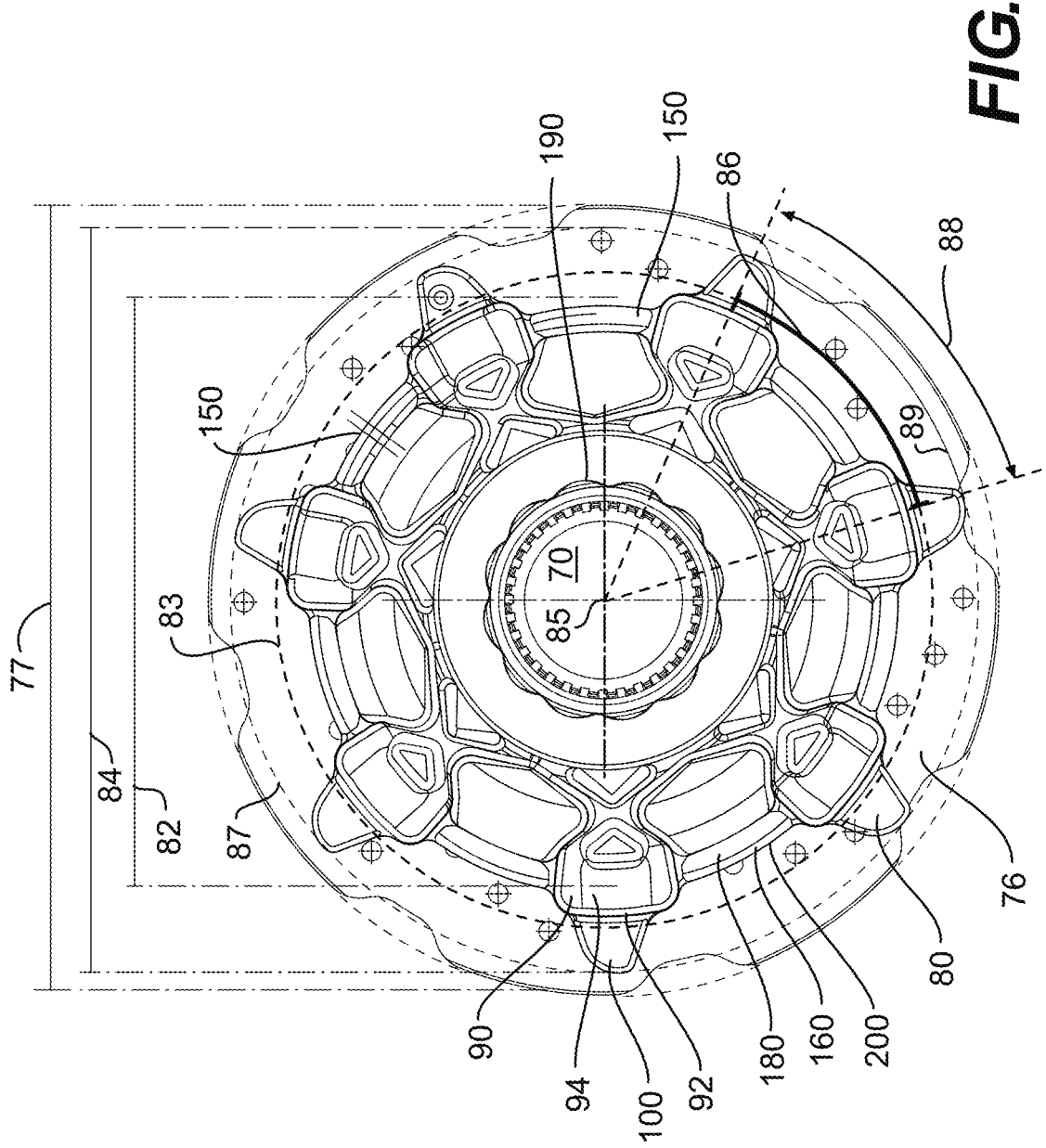
FIG. 10 is a right side elevation view of the snowmobile portion of FIG. 9 with the track removed for clarity.

With reference to FIGS. 2, 9 and 10, the left end of the drive axle 70 has a brake disc 76 coaxially mounted thereon. The brake disc 76 rotates with the drive axle 70 about the axis 85. The brake disc 76 is selectively engaged by a brake caliper (not shown) connected to a brake actuator (not shown) mounted on the handlebar 64. Upon actuation of the brake actuator, the brake caliper applies a force on the brake disk 76, in a direction opposite to the torque applied by the engine 24 in order to slow down or stop motion of the snowmobile 10.

With reference to FIGS. 2 to 5, the elongated tunnel 18 has a left side wall 18b, a top wall 18a and a right side wall 18b forming an inverted U-shaped structure when viewed from the front. A longitudinally extending gap 18c is defined in the top wall 18a. The gap 18c extends along the longitudinal centerplane 13. Each side wall 18b has an upper front edge 18d that extends downwards and forwards from the front end of the top wall 18a, and a lower front edge 18e that extends downwards and forwards from the upper front edge 18d. The upper and lower front edges 18d, 18e of the left and right side walls 18b form the front of the tunnel 18.

The drive axle 70 extends laterally through the forward portion of the tunnel 18 such that the left end of the drive axle 70 extends out of a left circular opening 19 defined in the left side wall 18b of the tunnel 18 and the right end of the drive axle 70 extends out of a right circular opening 19 defined in the right side wall 18b of the tunnel 18. The sprockets 80 are disposed inside the tunnel 18 between the left and right side walls 18b as can be seen in FIG. 4. The brake disk 76 is mounted on the left end of the drive axle 70 outside the tunnel 18 adjacent to the left side wall 18b as can be seen in FIG. 2. The drive axle 70 is disposed rearward of the engine cradle portion 20. The engine cradle portion 20 is disposed lower than the drive axle 70 and the sprockets 80. The vertical position of the drive axle 70 and the sprockets 80 mounted thereon is determined such that the drive axle 70 and the sprockets 80 are sufficiently spaced from the ground to avoid interference with obstructions such as rocks, etc. such that a center of gravity of the snowmobile 10 is sufficiently low to provide good handling.

As can be seen in FIG. 16, the front edge of the opening 19 is disposed longitudinally rearward of the toehold 51. A plane 81 containing the drive sprocket axis 85 and a rotation axis 44a of the upper idler wheel 44 intersects the pivot axis 29b of each of the left and right lower front suspension A-arms 28b. The pivot axis 29b intersects the plane 81 at a location that is longitudinally between the front and rear members of the lower front suspension A-arm 28b.

Figure 17A:
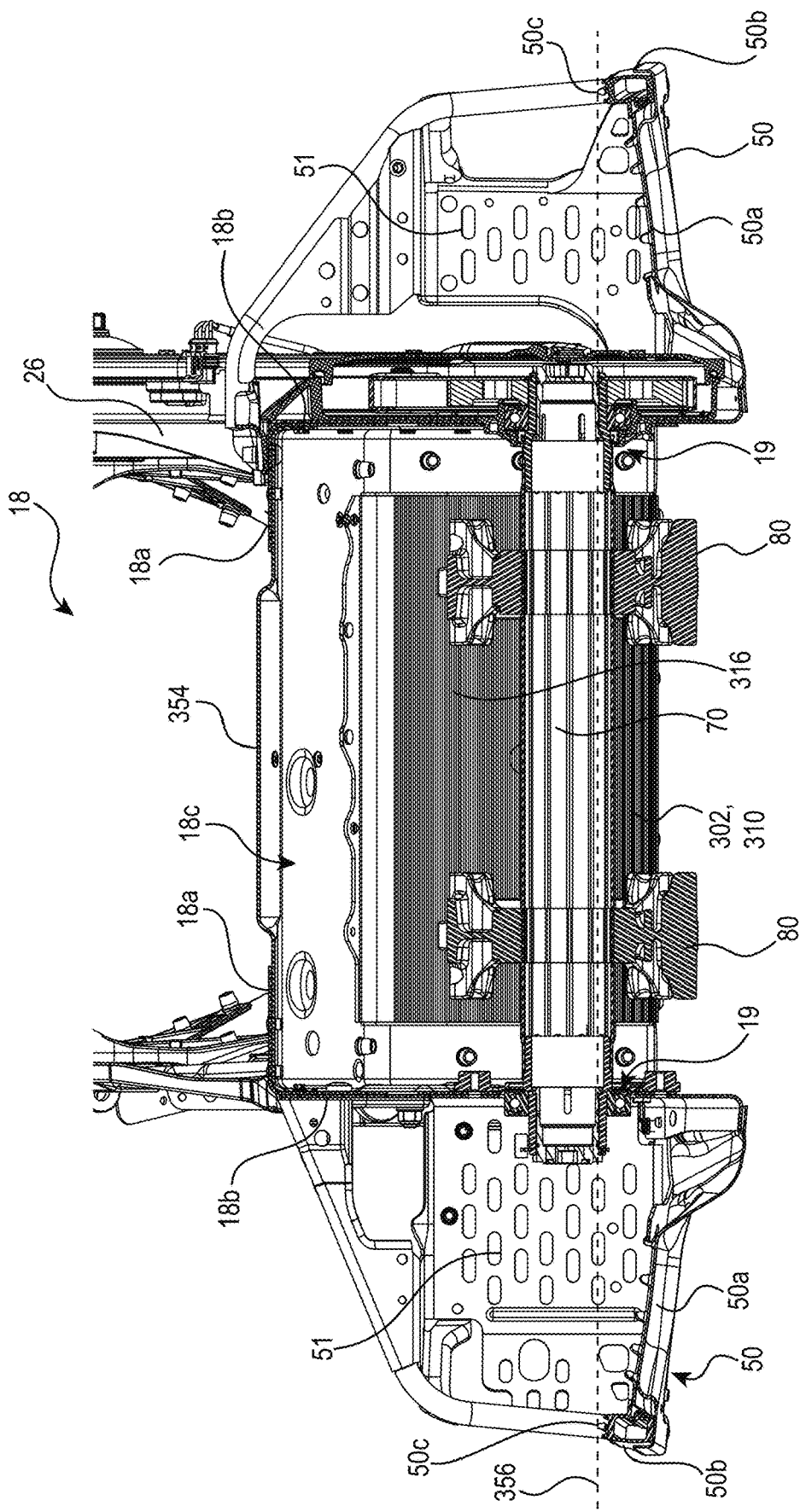
FIG. 17A is a cross-sectional view taken along the line 17-17 of FIG. 16.
Figure 17B:
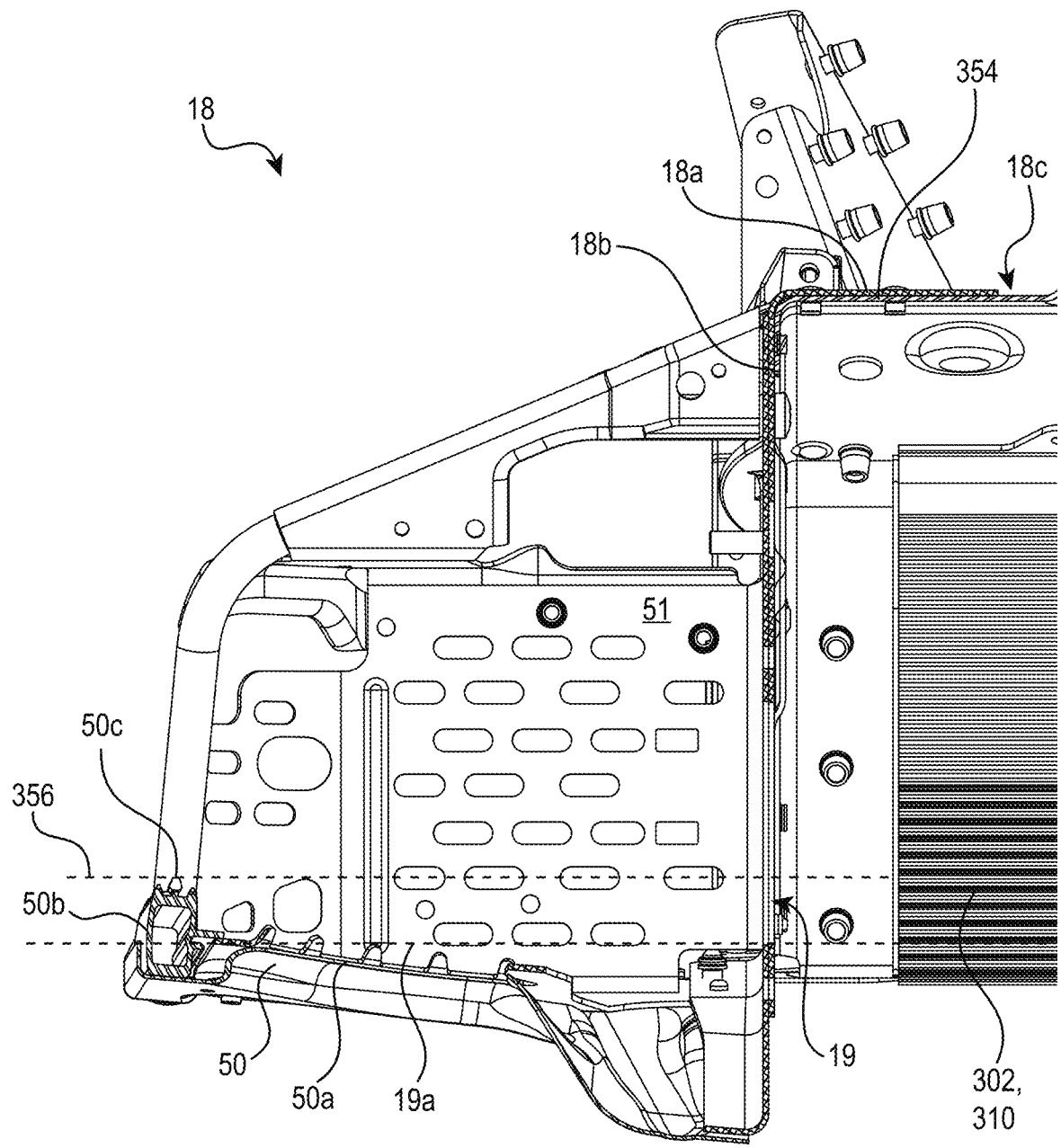
FIG. 17B is a cross-sectional view taken along the line 17-17 of FIG. 16 and including the front drive axle and the drive sprockets of the snowmobile of FIG. 1.

With reference to FIGS. 17A and 17B, the rim 50b of the footrest 50 and the spikes 50c extending upwards therefrom extend vertically higher than the lower edge of the left opening 19. As can be seen best in FIG. 17B, a horizontal plane 356 passing through the top of the spikes 50c is disposed above a horizontal plane 19a (FIG. 17B) passing through the bottom of the opening 19. As can be seen in FIG. 17A, the lower surface of the drive axle 70 is also disposed vertically below the plane 356 passing though the top of the spikes 50c.

With reference to FIGS. 5 to 10, each sprocket 80 includes three sets of sprocket teeth 90, 100, 110 by which the sprocket 80 engages the track 30. The teeth 90, 110 are axial teeth that engage corresponding internal lugs (or track lugs, or track teeth) 260 of the endless drive track 30 to provide traction between the sprockets 80 and the endless drive track 30. The teeth 100 are radial teeth 100 that engage apertures 240 of the drive track 30 between the internal lugs 260. While two sprockets 80 are used in the illustrated embodiments, it is contemplated that the number of sprockets 80 could be one or greater than two.

The two drive sprockets 80 (left and right) being identical, only a left drive sprocket 80 will be described. The drive sprocket 80 comprises a generally disc-shaped sprocket wheel 150 that has an outer perimetrical surface 160 and two opposing axial surfaces 170, 180. The sprocket wheel 150 has a central bore 190 through which the drive axle 70 extends. The bore 190 and the drive axle 70 have mating cross-sections that rotationally secure the sprocket 80 to the drive axle 70. Alternative methods of rotationally securing the sprocket 80 to the drive axle 70 may also be used (e.g., a key and keyway, square cross-sections, radial pins, etc.).

As best seen in FIG. 10, the sprocket wheel 150 has a diameter 82. The sprocket 80 has a diameter 84 as defined by a diameter of a cylinder 87 circumscribing the entirety of the sprocket 80 including the radial teeth 100. The diameter 84 of the sprocket 80 is smaller than the diameter 77 of the brake disc 76 mounted on the drive axle 70 laterally outward of the sprocket 80.

The axial sprocket teeth 90 are circumferentially-spaced teeth that project axially outwardly from the axial surface 180, and the sprocket teeth 110 comprise circumferentially-spaced teeth that project axially outwardly from the axial surface 170. It is contemplated that the axial sprocket teeth 90, 110 could be mirror images of each other. The outer axial surface 180 curves axially inwards between consecutive outer axial sprocket teeth 90. The inner axial surface 170 is substantially planar between consecutive inner axial sprocket teeth 110. The radial sprocket teeth 100 comprise circumferentially-spaced teeth that project radially outwardly from the wheel 150. The perimetrical surface 160 forms a sprocket valley 200 between consecutive sprocket teeth 100.

The drive sprocket 80 has seven sprocket teeth 90, seven sprocket teeth 100, and seven sprocket teeth 110. It is contemplated that the drive sprocket 80 could have more or less than seven sprocket teeth 90, seven sprocket teeth 100, and seven sprocket teeth 110.

The sprocket teeth 90, 100, 110 are aligned with each other in the circumferential direction such that each axial sprocket tooth 90 is disposed at the same circumferential position as a corresponding one of the axial sprocket teeth 110 and a corresponding one of the radial sprocket teeth 100. It is contemplated that the sets of sprocket teeth 90, 100, 110 could be offset from one another in the circumferential direction.

As best seen in FIG. 5, each axial tooth 90 has a radially outer surface 92 and an axially outer surface 94. Each axial tooth 110 has a radially outer surface 112 and an axially outer surface 114. The axially outer surfaces 92, 112 are curved axially inwards in the middle portion thereof. Each axial tooth 90 is formed integrally with the corresponding axial tooth 110. The radially outer surfaces 92 and 112 form a continuous surface extending across the perimetrical surface 160 of the wheel 150 and disposed radially outwards of the perimetrical surface 160.

The corresponding radial tooth 100 extends radially outwards from the continuous surface 92, 112. Each radial tooth 100 is formed integrally with the corresponding axial teeth 90, 110. It is contemplated that the corresponding teeth 90, 100, 110 could not be formed integrally.

Figure 8:
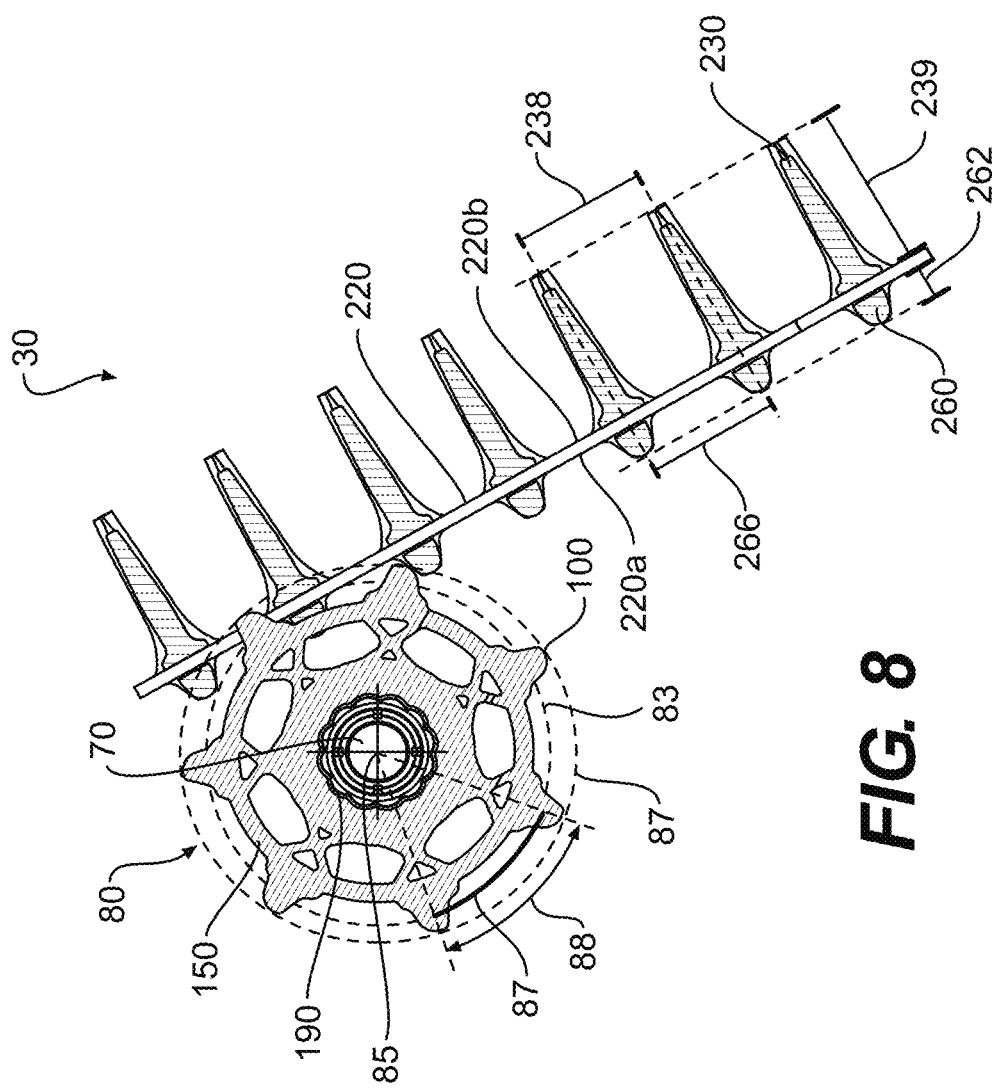
FIG. 8 is a cross-sectional view of the snowmobile portion of FIG. 5 taken along the line B-B of FIG. 7.

With reference to FIGS. 8 and 10, consecutive axial sprocket teeth 90 are disposed at an angular sprocket pitch 88 from each other. Consecutive axial sprocket teeth 110 are also disposed at the angular sprocket pitch 88 from each other. Furthermore, consecutive radial sprocket teeth 100 are also disposed at the angular sprocket pitch 88 from each other. The angular sprocket pitch 88 is 51.4 degrees. It is contemplated that the sprocket pitch 88 could be more or less than 51.4 degrees depending on the number of sprocket teeth 90, 100, 110. For example the sprocket pitch 88 could be 40 degrees if the sprocket 80 had nine teeth 90. It is contemplated that the axial sprocket teeth 90, 110 could have a sprocket pitch different from a sprocket pitch of the radial sprocket teeth 100. It is also contemplated that the axial sprocket teeth 90 could have a sprocket pitch different from a sprocket pitch of the axial sprocket teeth 100.

As the drive track 30 moves over the sprocket 80, the surfaces 92, 112 of the axial teeth 90, 110 contact the inner surface 220a of the drive track 30. The circumferential spacing between consecutive teeth 90, 110 can be described as a circumferential sprocket pitch 86 for the sprocket 80. With reference to FIG. 10, a circumferential sprocket pitch 86 for the sprocket 80 can be defined based on the circumferential spacing along a cylinder 83 circumscribing the radially outer surfaces 92, 112. The circumferential sprocket pitch 86 for the sprocket 80 would be given by the spacing 86 on the cylinder 83 between the centers of consecutive teeth 90 or 100 or 110.

A circumferential sprocket pitch could similarly be defined for a particular set of teeth 90, 100, 110 of the sprocket 80 by the circumferential spacing along a cylinder circumscribing that particular set of teeth. For example, the circumferential axial teeth pitch for the axial teeth 90, 110 would be the circumferential sprocket pitch 86 measured along the cylinder 83. The circumferential radial teeth pitch for the radial teeth 100 would be the spacing 89 along the cylinder 87.

The sprocket pitches 86, 88 are determined based on a pitch 266 (discussed further below) between consecutive internal lugs 120 in order to ensure traction between the sprocket 80 and the drive track 30.

The sprocket wheel 150 and the sprocket teeth 90, 100, 110 are integrally formed as mentioned above. To reduce the weight of the snowmobile 10, the sprocket 80 is made of a strong, light material (such as plastic). It is contemplated that the sprocket 80 could be made of any other material including steel or a composite material including aluminum. It is also contemplated that the sprocket 80 could be made of a composite including carbon fibers. A composition of the sprocket 80 may be selected from a wide variety of substances. It is contemplated that the sprocket teeth 90, 100, 110 could be formed separately from the sprocket wheel 150 and subsequently rigidly fastened (via rivets, welds, bolts, etc.) to the sprocket wheel 150.

With reference to FIGS. 5 to 10, a first embodiment of the endless drive track 30 will be described. The endless drive track 30 has an endless flexible belt 220 which has an inner surface 220a and an outer surface 220b and edges 222. The endless drive track 30 defines a longitudinal direction 5 and a lateral direction 6 for the drive track 30. In the description of the drive track below, the terms "longitudinal" and "lateral" are used with respect to the respective directions as defined by the drive track 30. The edges 222 are thus longitudinally extending edges 222. When the drive track 30 is mounted on the snowmobile 10, the longitudinal direction 5 defined by a given portion of the drive track 30 can be different from the longitudinal direction 3 defined for the snowmobile 10 by the tunnel 18. The lateral direction 6 defined by the drive track 30 is the same as the lateral direction 4 defined by the tunnel 18 when the drive track 30 is mounted on the snowmobile 10.

The endless drive track 30 includes a plurality of external lugs 230 that project outwardly from the outer side 220b and a plurality of internal lugs 260 that project inwardly from the inner side 220a. The plurality of external lugs 230 provide the endless drive track 30 with traction against snow as the endless drive track 30 propels the snowmobile 10. As mentioned above, the internal lugs 260 are engaged by the axial teeth 90, 110 so as to move the belt 220 around the suspension assembly 32.

The endless drive track 30 is made of a strong, flexible material such as rubber reinforced with fabric and metal. The endless belt 220, the external lugs 230 and the internal lugs 260 are integrally formed with each other.

The endless belt 220 has a width (measured in the lateral direction 6 between edges 222) of 40.64 cm (16 inches). It is contemplated that the width of the endless belt 220 could be more or less than 40.64 cm (16 inches). For example, the width could be 33.02 cm (13 inches), 35.56 cm (14 inches), 35.56 cm (15 inches), 50.8 cm (20 inches) or 60 cm (24 inches).

A length of the endless belt 220 (measured in the longitudinal direction 5) is 147 inches (373.38 cm). It is contemplated that the length of the endless belt 220 could be more or less than 147 inches. The length of the belt could be any multiple of the lug pitches 238 and 266 discussed further below.

The plurality of internal lugs 260 includes inner track lugs 120, 130 and outer track lugs 140. The inner track lugs 130 and the outer track lugs 140 come in contact with the two sprockets 80 for providing traction to the snowmobile 10. The inner track lugs 130 and the outer track lugs 140 also come in contact with the slide rail 34 for ensuring that the endless belt 220 stays in alignment. All of the internal lugs 260 are identical to each other in the embodiment shown in FIGS. 5 to 10. It is contemplated however that the lugs 260 could not all be identical and could include two or more different kinds of internal lugs 260.

The inner internal lugs 120 form two longitudinal rows 122, the inner internal lugs 130 form two longitudinal rows 132, and the outer internal lugs 140 form two longitudinal rows 142. The inner internal lugs 120 are aligned with the inner internal lugs 130 and the outer internal lugs 140 in the longitudinal direction 5 so as to form lateral rows 264. It is however contemplated that some or all of the internal lugs 120 could be offset from the corresponding lugs 130 and/or 140. Similarly some or all the lugs 130 could be offset from the corresponding lugs 140.

The lateral rows 264 of internal lugs 120, 130, 140 are spaced at an internal lug pitch 266 of approximately 7.62 cm (3 inches). The internal lug pitch 266 is defined with respect to the longitudinal centers of consecutive lugs 260 of consecutive rows 264. It should be understood that the actual value of the lug pitch 266 in a given region of the drive track 30 can vary from the stated value of the lug pitch 266 due to manufacturing tolerances or due to the resilient deformation of the moving drive track 30.

It is contemplated that the internal lug pitch 266 could be more or less than 7.62 cm (3 inches). It is also contemplated that the inner lug pitch of the inner track lugs 120 could be different from the inner lug pitch of the inner track lugs 130 and/or the outer lug pitch of the outer lugs 140. It is also contemplated that the inner lug pitch of the inner track lugs 130 could be different from the outer lug pitch of the outer lugs 140. It is further contemplated that more than one internal lug pitch 266 could be defined by the longitudinal spacing between two consecutive track lugs 120 and/or 130 and/or 140.

The configuration, including alignment and spacing, of the inner lugs 130 with the outer lugs 140 is complementary to the configuration of the axial teeth 90, 110. Thus, the internal lug pitch 266 can be equal to the circumferential sprocket pitch 86 of the axial teeth 90, 110. The internal lug pitch 266 could also be a multiple or a factor of the pitch 86.

Figure 6A:
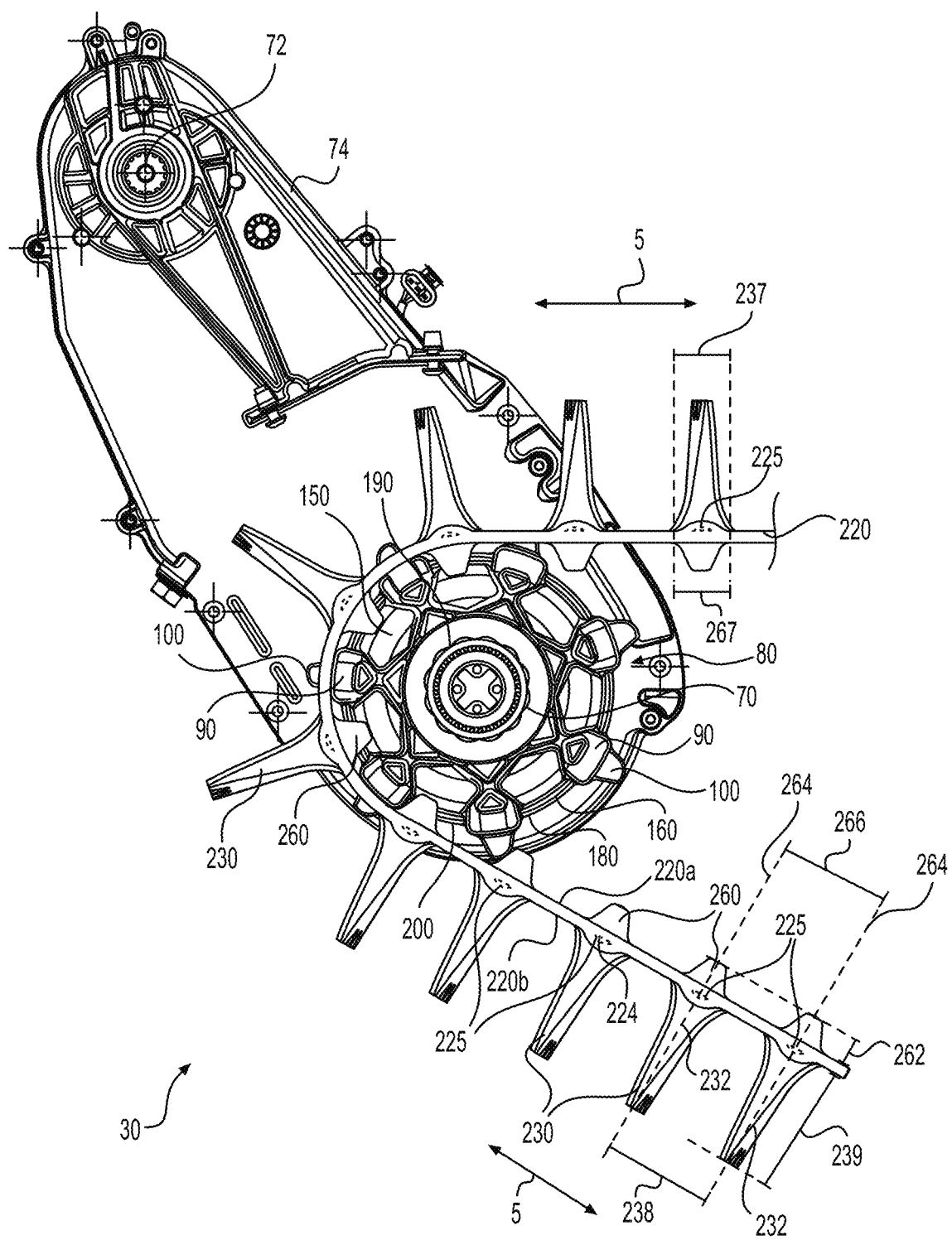
FIG. 6A is a left side elevation view of the snowmobile portion of FIG. 5 with a drive track having a first embodiment of external lugs.
Figure 6B:
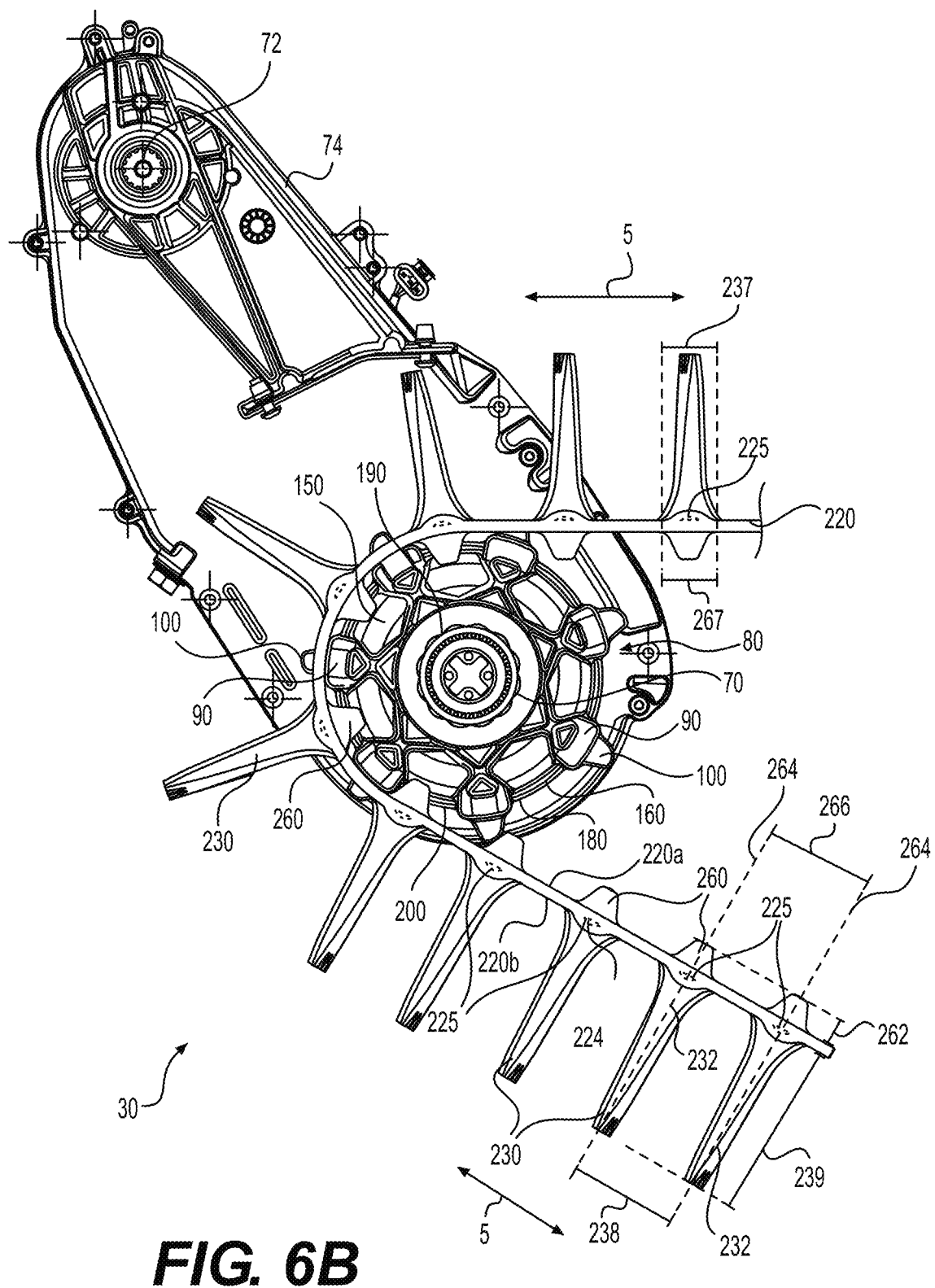
FIG. 6B is a left side elevation view of the snowmobile portion of FIG. 5 with a drive track having a second embodiment of external lugs.

As best seen in FIGS. 6A, 6B and 8, the internal lugs 260 extend inwards from the surface 220a to a height 262 (measured in a direction normal to the inner surface 220a, i.e. perpendicular to the longitudinal direction 5 and the lateral direction 6) which is about 1.27 cm (0.5 inches). It is contemplated that the height 262 could be more or less than 1.27 cm (0.5 inches). The height 262 of the internal lugs 260 is smaller than the pitch 234 of the internal lugs. In the illustrated embodiments, all the internal lugs 260 have the same height 262. It is however contemplated that the height 262 of some of the internal lugs 260 could be different from the height 262 of other internal lugs 260.

Figure 7:
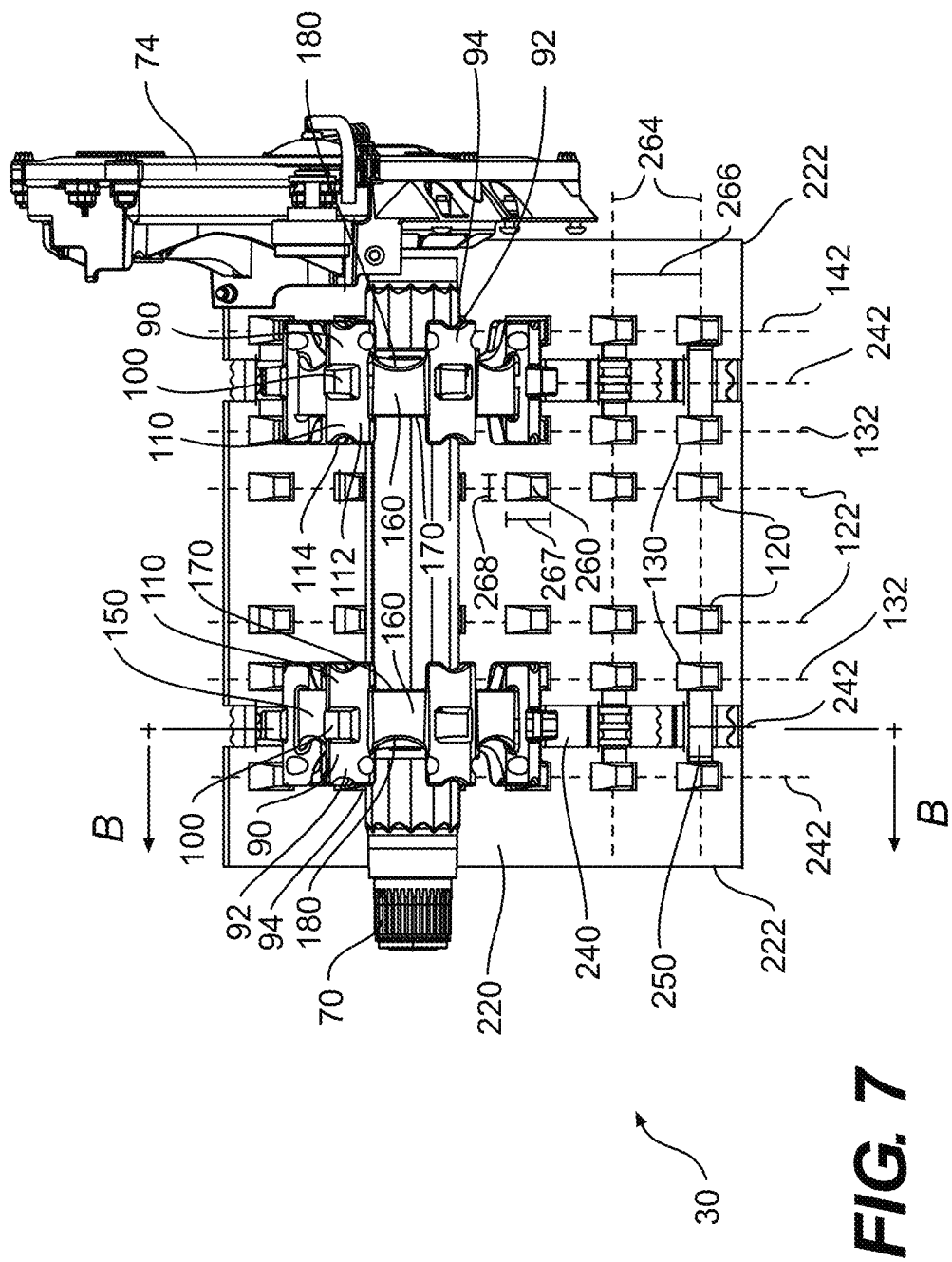
FIG. 7 is a top plan view of the snowmobile portion of FIG. 5.

Each internal lug 260 has a longitudinal width 267 (FIGS. 6A, 6B and 7) measured in the longitudinal direction 5. Each internal lug has a lateral width 268 measured in the lateral direction (FIG. 7).

A plurality of longitudinally spaced apertures (or windows) 240 are defined in the endless belt 220. Each aperture 240 extends through the belt 220 between the inner and outer surfaces 220a and 220b. The apertures 240 are disposed in two longitudinal rows 242. It is contemplated that the plurality of longitudinally spaced apertures 240 could be disposed in a fashion other than in a longitudinal row. It is also contemplated that the plurality of longitudinally spaced apertures 240 could form only one row 242 or more than two rows 242.

The apertures 240 are engaged by the radial sprocket teeth 100 for moving the belt 220. It is contemplated that the plurality of longitudinally spaced apertures 240 could be omitted for use with sprockets 80 from which radial teeth 100 are omitted. The configuration of the apertures 240, including spacing and alignment with inner lugs 130 and the outer lugs 140 is complementary to the configuration of the radial teeth 100, including the spacing therebetween and alignment with axial teeth 90, 110. The shape of each aperture 240 is generally rectangular to engage the generally rectangular contour of the radial teeth 100. It is contemplated that the shape of the apertures 240 and radial teeth 100 could be different, such as circular or elliptical, but complementary to enable engagement between the teeth 100 and belt 220.

The endless drive track 30 also comprises a plurality of alignment cleats 250 that are mounted onto the outer track lugs 140 and extend in between the apertures 240 as can be seen best in FIG. 9. Each cleat 250 includes a base portion 250a and a cleat portion 250b. The base portion 250a has a generally C-shaped cross-section that wraps around the inner track lugs 120, 130. The cleat portion 250b projects inwardly away from the inner side 220a of the belt 220. The alignment cleats 250 are made of a strong, light, stamped sheet of metal such as steel. As would be appreciated by those skilled in the art, however, any other suitable material (e.g., aluminum, etc.) may be used. Moreover, the cleats 250 need not be stamped from a metal sheet but may be cast or molded into the appropriate configuration.

The plurality of external lugs 230 form a plurality of external lug lateral rows 232. Each external lug lateral row 232 contains two external lugs 230. The external lugs 230 of different lateral rows 232 are aligned in the longitudinal direction to form two longitudinal rows 231 (indicated in FIGS. 5 and 12A). A rib 224 (FIGS. 5 and 9) extends laterally along the outer surface 220b between the lateral edges 222. The rib 224, formed by a metal rod 225 (shown schematically in FIGS. 6A and 6B) underneath the rubber surface 220b of the belt 220, provides structural support to the belt 220. Each lateral row 232 coincides with a rib 224 passing through the base of each lug 230 thereof. Therefore, in the illustrated embodiment, all of the rows 232 have ribs 224 extending therealong. It is however contemplated that some of the ribs 224 could not coincide with a row 232. For example, only alternate lateral rows 232 could coincide with a rib 224. It is also contemplated that the ribs 224 could also be omitted.

Figure 11A:
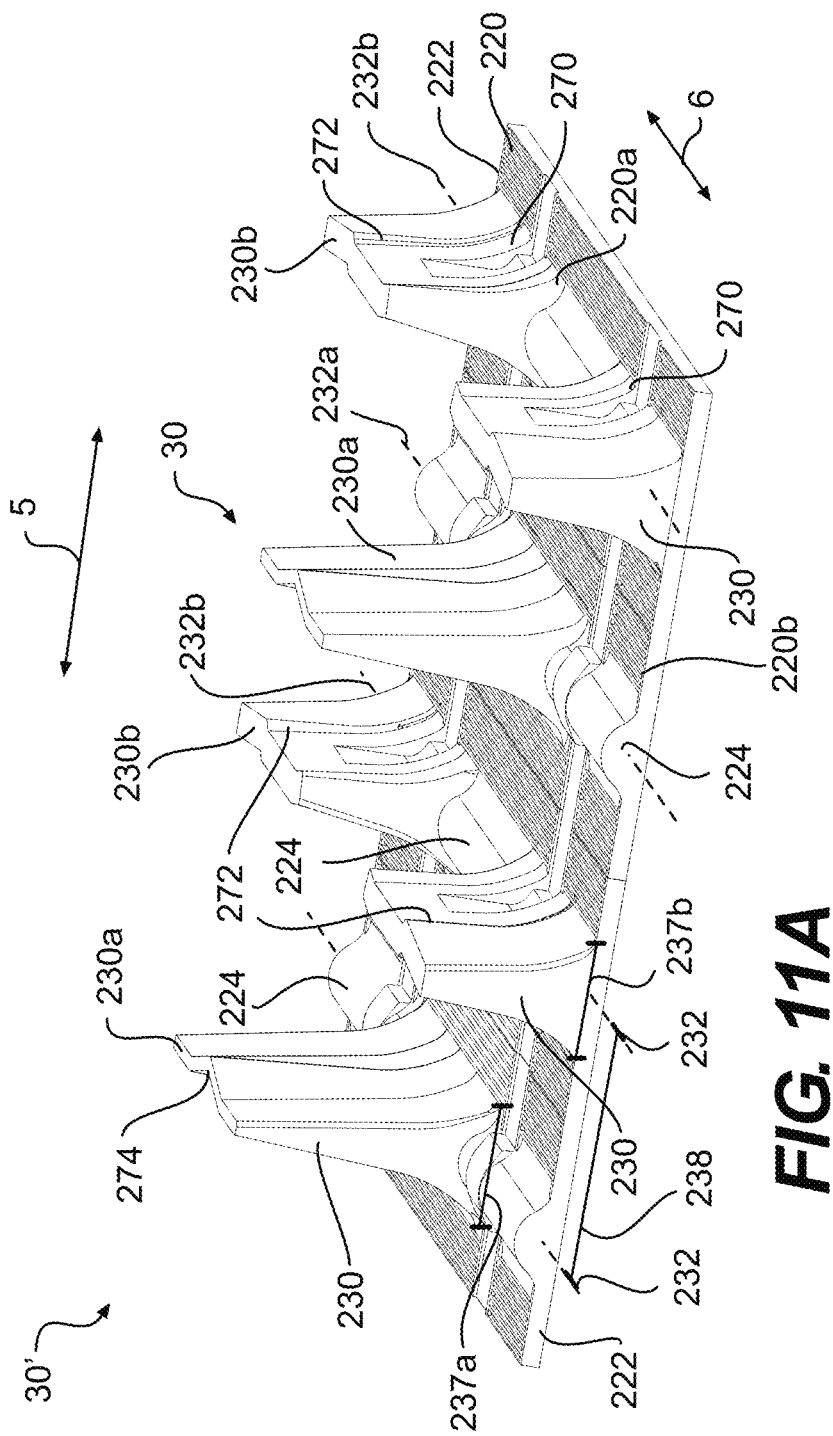
FIG. 11A is a perspective view taken from a front, right side of a portion of a drive track according to another embodiment.
Figure 11B:
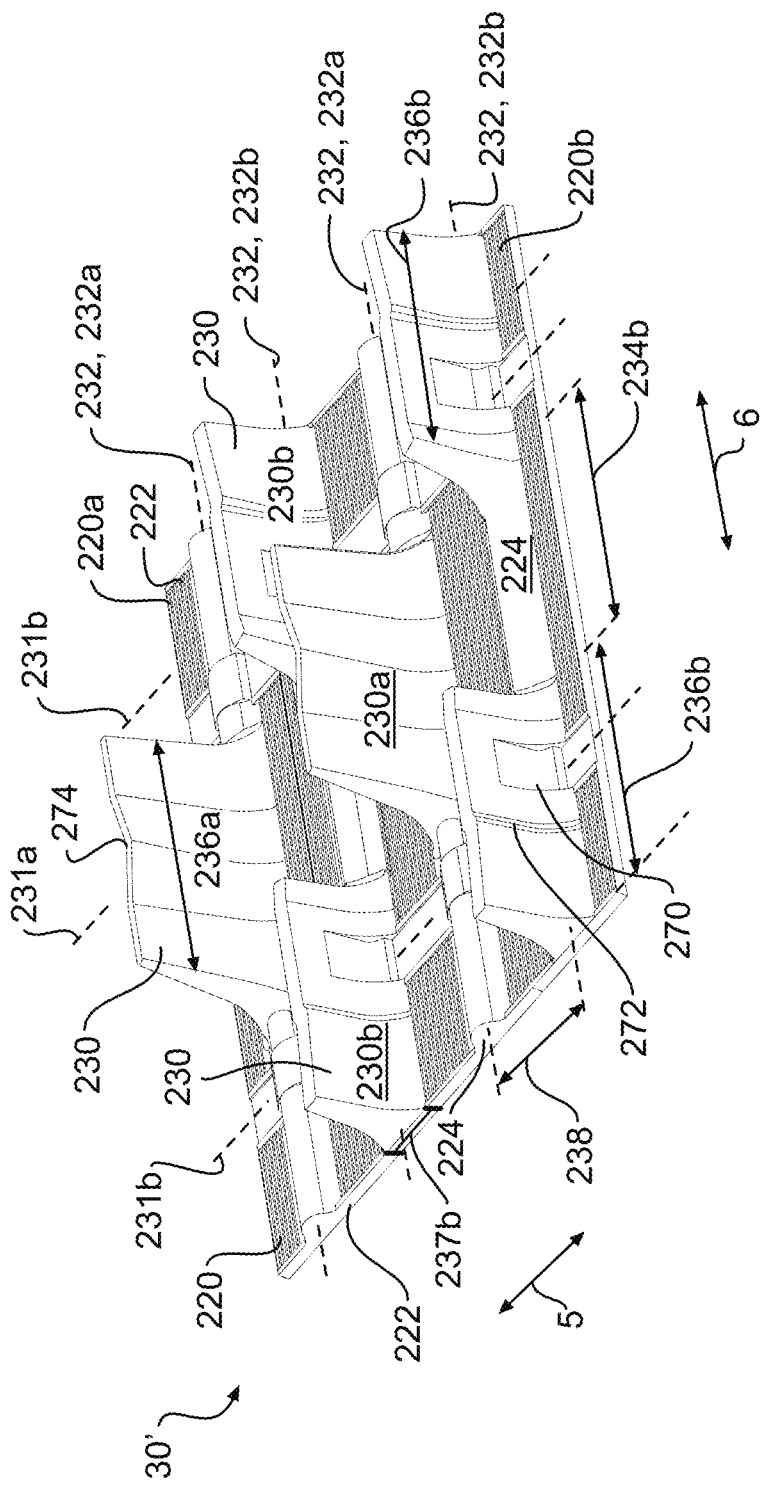
FIG. 11B is another perspective view taken from a front, right side of the portion of the drive track of FIG. 11A.

All of the external lugs 230 are identical to each other in the embodiment shown in FIGS. 5 to 10. Each external lug 230 is elongated in the lateral direction and has a uniform lateral width 236 (FIG. 5) between longitudinally extending left and right surfaces. The longitudinal width 237 (FIGS. 6A and 6B) between laterally extending surfaces of each lug 230 decreases with distance away from the surface 220b. It is contemplated that the lugs 230 could not all be identical and include two or more different kinds of external lugs 230 as shown in FIGS. 11A and 11B.

The external lugs 230 of each lateral row 232 are separated by a laterally separation 234 (FIG. 5). In the illustrated embodiment, the lateral separation 234 is generally equal to the lateral width 236. It is contemplated that the lateral separation 234 between two lugs 230 could be different from the lateral width 236 of each lug 230.

The longitudinally spacing between the external lug lateral rows 232 is an external lug pitch 238 of approximately 7.62 cm (3 inches) (best seen in FIGS. 6A and 6B). The external lug pitch 238 is defined with respect to the longitudinal centers of consecutive lugs 230 of consecutive rows 232. The external lug pitch 238 can also be measured with respect to the centers of consecutive rods 225. The external lug pitch 238 is equal to the internal lug pitch 266. It is contemplated that the external lug pitch 238 could be smaller or greater than the internal lug pitch 266. It is contemplated that the external lug pitch 238 could be more or less than 7.62 cm (3 inches). It is also contemplated that more than one external lug pitch 238 could exist between the external lug longitudinal rows 232. It should be understood that the actual value of the external lug pitch 238 in a given region of the drive track 30 can vary from the stated value of the external lug pitch 238 due to manufacturing tolerances or due to the resilient deformation of the moving drive track 30.

Each external lug 230 has a height 239 (measured in a direction normal to the outer surface 220b, i.e. perpendicular to the longitudinal direction 5 and the lateral direction 6) of the external lugs 260. The height of the external lugs 230 of the drive track 30 shown in FIG. 6A is 8.26 cm (3.25 inches). It is contemplated that the height 239 could be more or less than 8.26 cm (3.25 inches). For example, FIG. 6B shows a drive track 30 having internal lugs 230 with a height of 10.16 cm (4 inches). The height 239 of the external lugs 230 is greater than the external lug pitch 238.

Increasing the lug height 239 provides increased traction which would be useful for travel in powdered snow-covered surfaces. It is also important for the drive track 30 to have traction with the sprocket 80 and thus to maintain sufficient contact between therebetween. In the configuration of the drive track 30 and sprocket 80 shown herein, at least three consecutive sprocket teeth 90, 100, 110 are in contact with the drive track 30 at all times which minimizes ratcheting caused by the sprocket 80 slipping with respect to the drive track 30.

Turning now to FIGS. 11A and 11B, a second embodiment of an endless drive track 30' will be described. The endless drive track 30' has features similar to the ones of the endless drive track 30. These features will be referred to using the same reference numerals as the ones of the endless drive track 30, and will not be described again herein in detail.

The endless drive track 30' includes a plurality of external lugs 230 on an outer face 220b of the endless belt 220. The plurality of external lugs 230 form lateral rows 232 that are longitudinally spaced by an external lug pitch 238 equal to 7.62 cm (3 inches). Each lateral row 232 contains either one external lug 230 or two external lugs 230. Alternate rows 232 contain one external lug 230. Each lug 230 of the drive track 30' is an elongated structure similar to the lugs 230 of the drive track 30. The rib 224 extends longitudinally along the outer surface 220b between the lateral edges 222. Each row 232 coincides with a rib 224 passing through the bases of the lugs 230 thereof.

More specifically, the external lugs 230 comprise two kinds of external lugs 230a and 230b. The lateral rows 232 comprise alternating rows 232a and 232b.

The lugs 230a are disposed in the center of rows 232a of the lateral rows 232. The lugs 230a are thus aligned in the longitudinal direction to form a single longitudinal row 231a. A middle portion 274 of each lug 230a is angled forward (when the outer surface 220b is on the bottom of the drive track 30) towards the lateral center of the lug 230a. The height 239a of each lugs 230a is greater than the external lug pitch 238 between consecutive rows 232 (i.e. between consecutive rows 232a and 232b).

The lugs 230b are disposed in rows 232b of the lateral rows 232. The two lugs 230b are mirror images of each other and laterally spaced by a distance 234b (FIG. 11B). The lugs 230b of different lateral rows 232b are aligned in the longitudinal direction to form two longitudinal rows 231b. The laterally extending front and rear surfaces of each lug 230b are discontinuous with a step 272 and a recesses 270 extending into the laterally extending surfaces of each external lug 232b. The recess 270 extends upwards from the surface 220b but does not extend to the top edge of the lug 230b. The lugs 230b have a height 239b which is smaller than the external lug pitch 238. The lateral width 236a of the lugs 230a is greater than the lateral width 232b of the lugs 230b.

Turning now to FIGS. 12A and 12B, a third embodiment of an endless drive track 30" will be described. The endless drive track 30" has features similar to the ones of the endless drive track 30. These features will be referred to using the same reference numerals as the ones of the endless drive track 30, and will not be described again herein in detail.

The drive track 30" has a plurality of external lugs 230 disposed in lateral rows 232 with a pitch 238 of approximately 7.62 cm (3 inches). Each lateral row has a left lug 230 disposed at the left end and a right lug 230 disposed at the right end, that is a mirror image of the left lug 230, so as to form two longitudinal rows 231 that are mirror images of one another. Each lug 230 extends inwards from its corresponding longitudinally extending edge 222 of the drive track 30". A recess 270 extends into the laterally extending surfaces of each lug 230. The recesses 270 are disposed slightly inward of the lateral center of the lug 230. The recesses 270 extend upwards from the base of the lug 230.

The belt 220" of the drive track 30" has longitudinal recesses 280 extending through the belt 220 between the inner and outer surfaces 220a, and 220b. The recesses 280 extend longitudinally through the entire length of the belt 220 under the longitudinal row of lugs 231. The recesses 280 of the belt 220 coincide with the recesses 270 of the lugs 230.

As the drive track 30, 30', or 30" rotates about the rear suspension assembly 32 propelling the snowmobile 10 on ground covered with snow and ice, some of the snow and ice from the ground is projected upwards onto the tunnel 18 and is used to cool the engine 24.

In the embodiment of the snowmobile 10 shown in FIGS. 3 and 4, a part of the tunnel 18 is formed by a heat exchanger assembly 400 for cooling the engine 24. The heat exchanger assembly 400 includes a front heat exchanger (not shown) connected to the front of the tunnel 18, and a top heat exchanger 408 connected to the top of the tunnel 18. Thus the gap 18c of the tunnel 18 is almost entirely covered with the heat exchanger assembly 400.

Liquid coolant is circulated through the engine 24 in order to cool the engine 24. The coolant, which gets heated by absorbing heat from the engine 24, is cooled by circulating through the heat exchanger assembly 400. The coolant in the heat exchanger assembly 400 is cooled by a combination of air flowing along the surfaces of the heat exchangers and snow being projected on to the heat exchanger surfaces by the drive track 30, 30', or 30". Fins formed along the rear surface of the front heat exchanger and the bottom surface of the top heat exchanger 408 increase the surface area exposed to the cold air, snow and ice for more efficient cooling of the coolant flowing inside.

Another embodiment of a heat exchanger assembly 300 will now be described with reference to FIGS. 13 to 15D.

Figure 13:
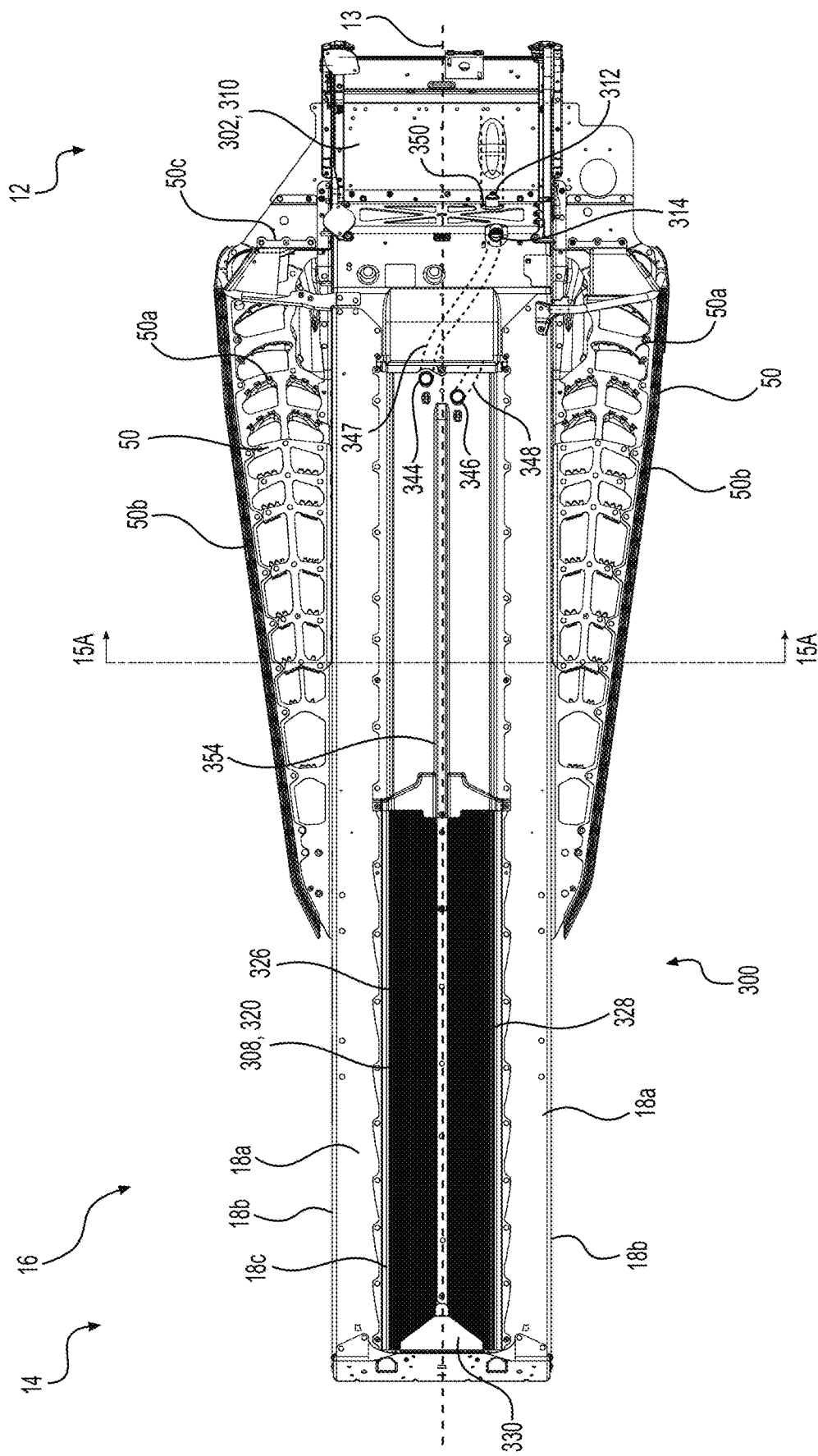
FIG. 13 is a top plan view of a tunnel of the snowmobile of FIG. 1 having an embodiment of a heat exchanger assembly.
Figure 14:
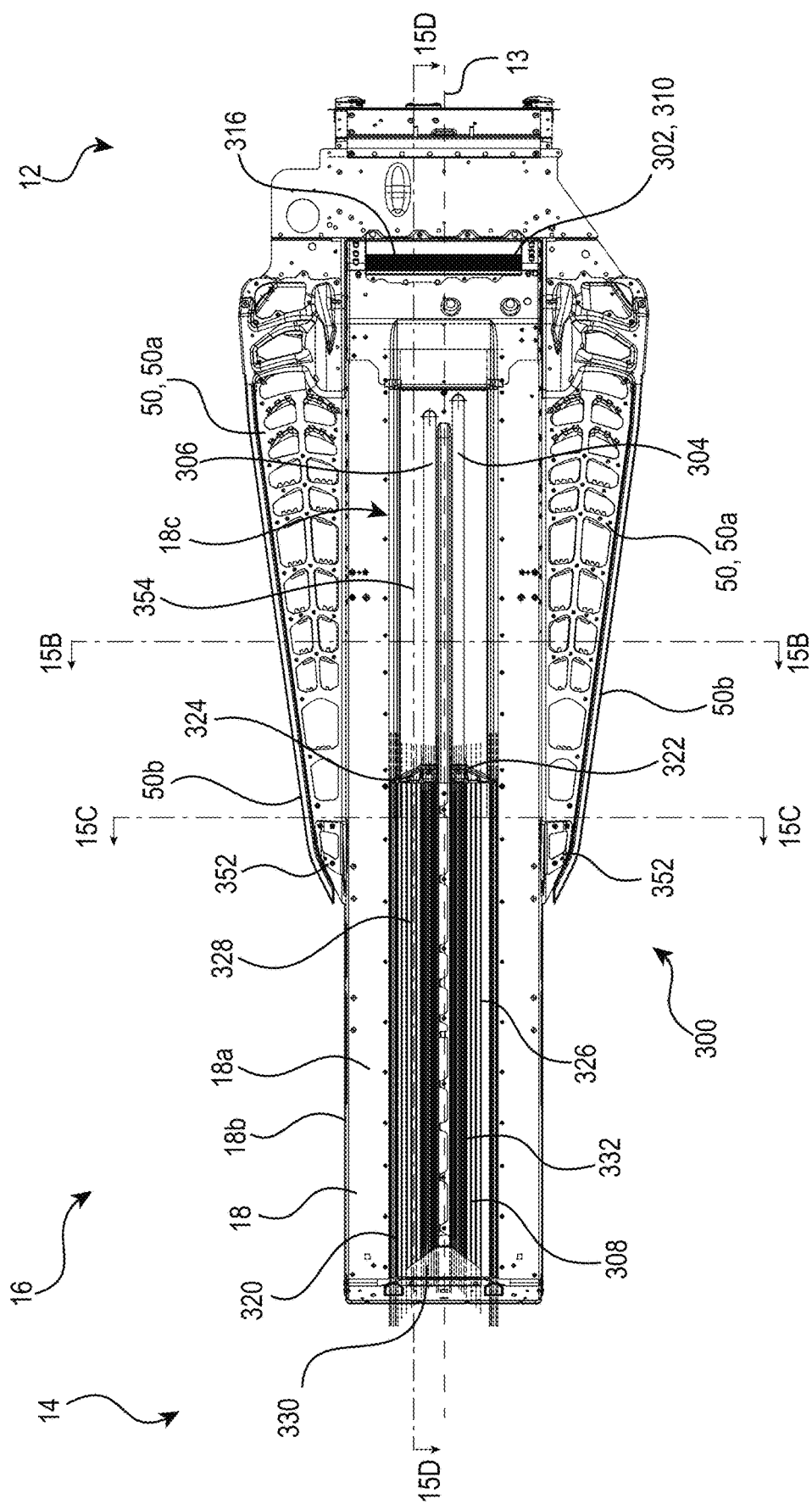
FIG. 14 is a bottom plan view of the tunnel and heat exchanger assembly of FIG. 13.

With reference to FIGS. 13 and 14, the heat exchanger assembly 300 includes a front heat exchanger 302, conduits 304, 306 and a top heat exchanger 308.

Figure 15A:
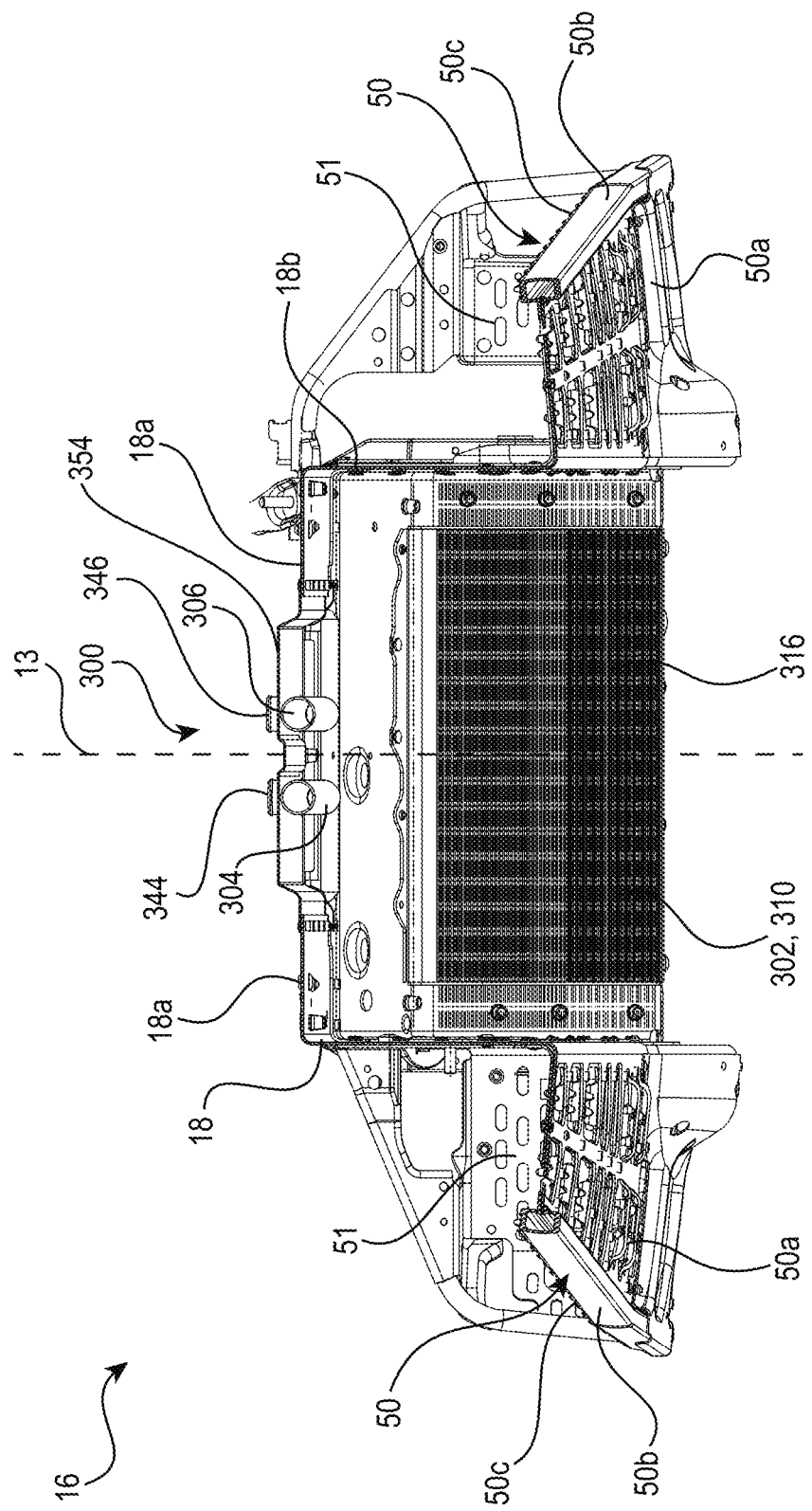
FIG. 15A is a cross-sectional view taken along the line 15A-15A of FIG. 13.
Figure 15B:
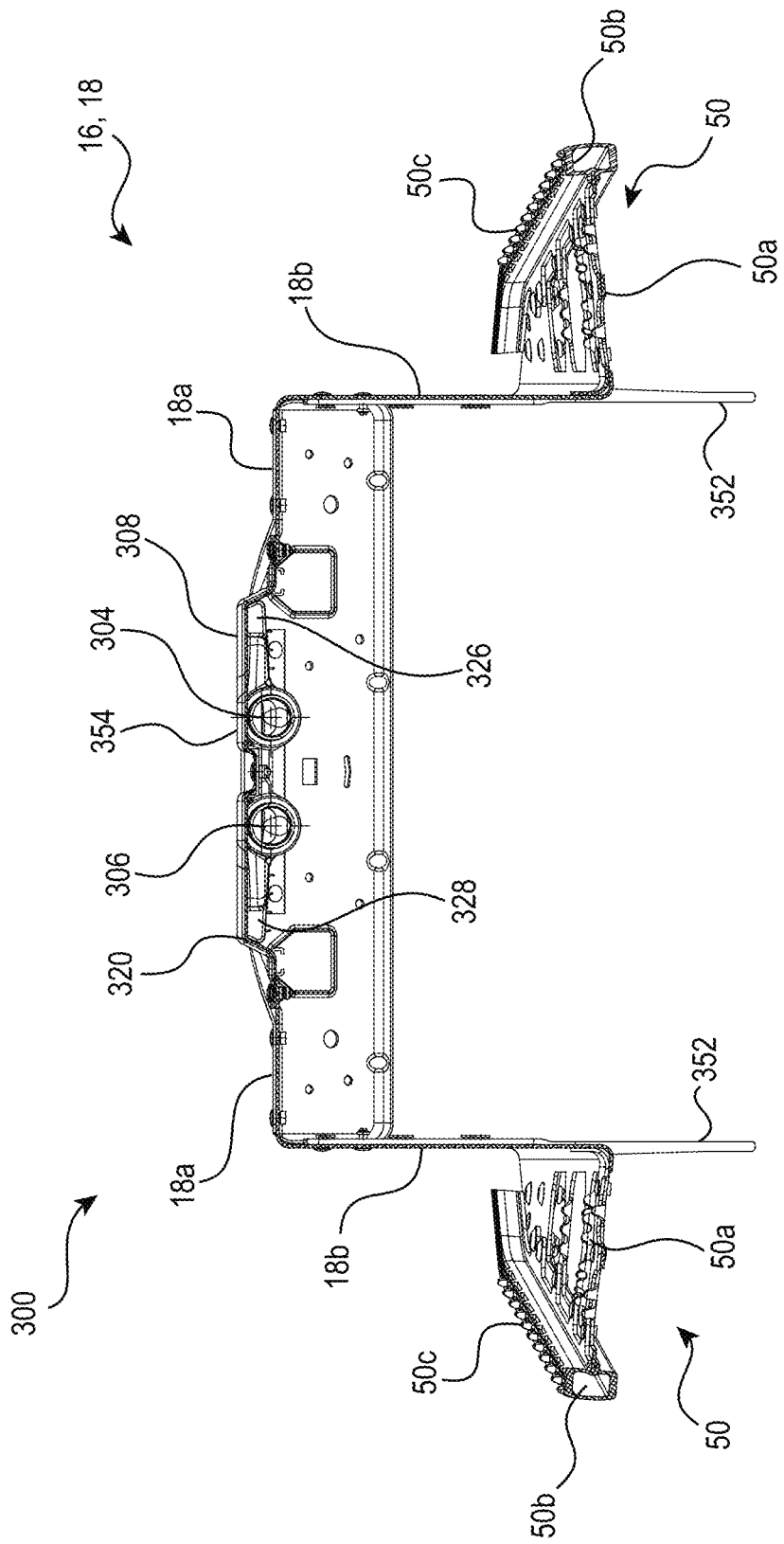
FIG. 15B is a cross-sectional view taken along the line 15B-15B of FIG. 14.

With reference to FIGS. 14 to 15B, the conduits 304, 306 are disposed adjacent the top 18a of the tunnel 18 in the front portion thereof. The left conduit 304 extends longitudinally on the left side of the longitudinal centerplane 13. The right conduit 306 extends longitudinally on the right side of the longitudinal centerplane 13. The conduits 304, 306 are formed by an extrusion process. It is contemplated that the conduits 304, 306 could be formed using a process other than extrusion. With reference to FIG. 13, a pipe 344 connected to the front end of the left conduit 304 extends vertically upwards through a plate 354 that is disposed over the gap 18c of the tunnel 18. Another pipe 346 connected to the front end of the right conduit 306 extends vertically upwards through the plate 354. The pipe 346 is disposed longitudinally rearwardly of the pipe 344. The pipe 346 is connected to the engine 24 via a hose 348 to receive heated coolant therefrom. The pipe 344 is connected to an inlet 314 of the front heat exchanger 302 by a hose 347. A portion of the conduits 304, 306 and/or the pipes 344, 346 is fixed to the plate 354. The plate 354 thus supports the conduits 304, 306 and the pipes 344, 346, helping prevent them from bending downward toward the drive track 30, 30', or 30". The plate 354 is riveted to the left and right tunnel side walls 18b. It is contemplated that the plate 354 could be fixed to the side walls 18b by other types of fasteners.

With reference to FIGS. 13, 14 and 15B to 15D, the top heat exchanger 308 is disposed on the rear portion of the top wall 18a over the gap 18c of the tunnel 18. The top heat exchanger 308 thus defines partly a top of the tunnel 18. The top heat exchanger 308 is riveted to the left and right tunnel side walls 18b. It is contemplated that the top heat exchanger 308 could be fixed to the side walls 18b by other types of fasteners.

The top heat exchanger 308 has a body 320 with a right passage 328 and a left passage 326. As can be seen in FIG. 15C, the width W of each passage 326 and 328 is greater than its maximum height H. The heat exchanger 308 is formed by an extrusion process. As can be seen in FIG. 14, the rear end of the left conduit 304 is welded to an outlet 322 formed at the front end of the left passage 326. The left conduit 304 is thus fluidly connected to the top heat exchanger 308. The rear end of the right conduit 306 is similarly welded to an inlet 324 formed at the front end of the right passage 328 to fluidly connect the top heat exchanger 308 with the right conduit 306. Fins 332 are formed on the bottom of the body 320. A connector 330, also formed by extrusion, is connected to the back of the two passages 326, 328 to fluidly connect the passage 326 to the passage 328.

Figure 15D:
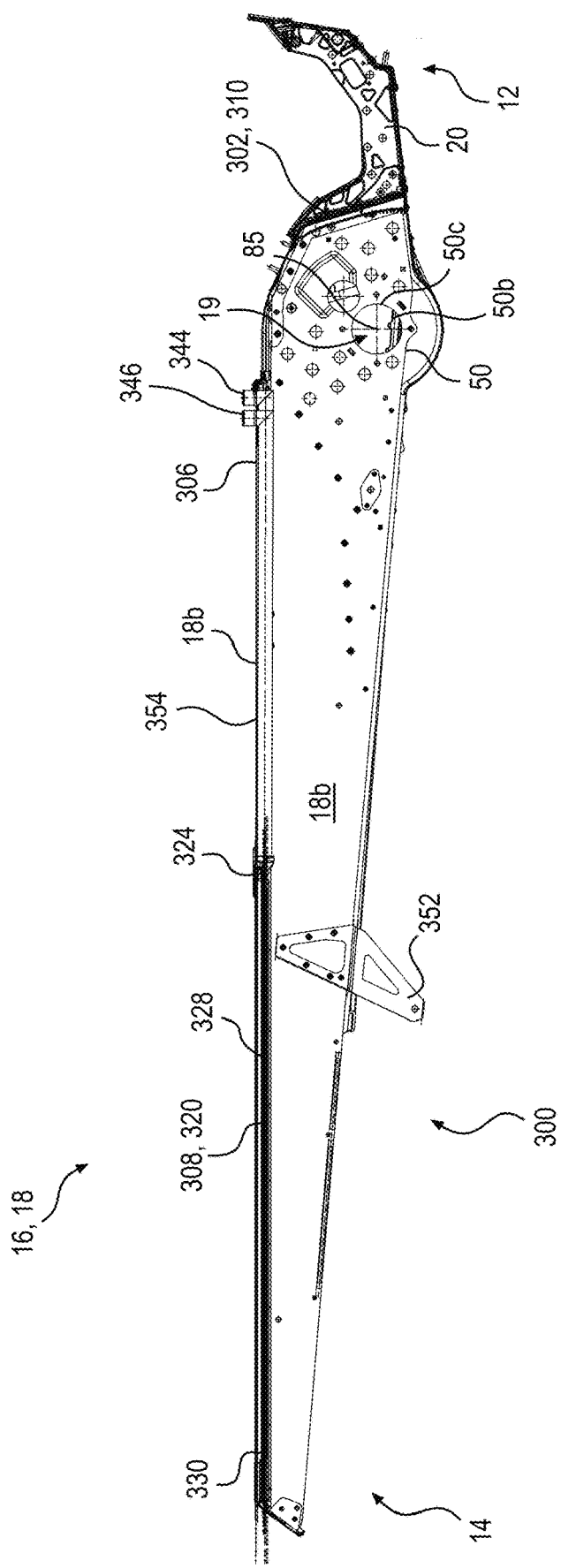
FIG. 15D is a cross-sectional view taken along the line 15D-15D of FIG. 14.

As can be seen in FIG. 15D, the top heat exchanger 308 therefore extends from the rear end of the tunnel 18 to a position longitudinally forward of the bracket 352 which attaches the upper idler wheel 44 to the tunnel 18, and thereby suspends the drive track 30, 30', or 30" to the tunnel 18. This area is considered to provide the best snow projection onto the heat exchanger 308 due to the directional change of the drive track 30. Passages 326 and 328 of heat exchanger 308 have a width W that is substantially greater than the diameter of conduits 304 and 306. The primary task of the conduits 304 and 306 is to transfer fluid between heat exchangers 302 and 308 thus their shape and material is not determined based on their heat exchanging characteristics as is the case with heat exchangers 302 and 308. Conduits 304 and 306 could be constructed from a rigid metal or a flexible material and their heat exchanging characteristics is lower than of the heat exchanger 308 for a given longitudinal distance.

With reference to FIGS. 13 to 15A, the front heat exchanger 302 has a body 310 defining an internal volume, an outlet pipe 312 and an inlet pipe 314. The pipes 312, 314 are welded to the body 310. The inlet pipe 314 is disposed above the outlet pipe 312. As mentioned above, the inlet pipe 314 is connected to the left conduit 304 via the hose 347. The outlet pipe 312 is connected to a hose 350 (FIG. 13) which is connected to the engine 24 to return cooled coolant thereto. Fins 316 are formed on the back of the body 310 as can be seen in FIG. 15A. The front heat exchanger 302 forms in part the lower portion of the front of the tunnel 18.

During operation of the snowmobile 10, heated coolant from the engine 24 flows via the hose 348 and the inlet pipe 346 to the right conduit 306. From the right conduit 306, the coolant flows via the inlet 324 into the right passage 328 of the top heat exchanger 308, then into the connector 330 and then to the left passage 326. The coolant then flows out of the top heat exchanger 308 via the outlet 322 of the left passage 326 into the left conduit 304 and then via its outlet pipe 344 and the hose 347 into the inlet 314 of the front heat exchanger 302. The coolant flows through the interior volume of the front heat exchanger 302 and out thereof via the outlet 312. The cooled coolant is then returned to the engine 24 via the hose 350.

A greater amount of snow is projected onto the front of the tunnel 18 and the rear portion of the top of the tunnel 18 than in the forward portion of the top of the tunnel 18. Therefore, using conduits 304, 306 to conduct coolant between the front of the tunnel 18 and the rear portion of the top of the tunnel 18 which receive more projected snow allows one to reduce the overall weight of the snowmobile 10 without significantly sacrificing cooling efficiency of the heat exchanger assembly 300. The heat exchanger assembly 300 in a snowmobile 10 having the drive track 30, 30', or 30" described above allows for compensation of the increased weight of the snowmobile 10 due to the heavier external lugs 230 described above.

The heat exchanger assembly 300 is also advantageous for weight compensation in a snowmobile 10 having a longer and thus a heavier drive track 30, 30', or 30". For example, in a snowmobile 10 having a longer drive track 30, 30', or 30" with a circumference (measured in the longitudinal direction) of 441.96 cm (174 inches) or 414.02 cm (163 inches) rather than a circumference of 373.38 cm (147 inches), the heat exchanger assembly 300 described above can provide adequate engine cooling while also reducing the overall weight of the snowmobile 10 to compensate for the additional weight of the drive track 30, 30' or 30".

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:
1. A snowmobile comprising:
a frame;
a suspension assembly connected to the frame;
an engine connected to the frame;
a drive axle operatively connected to the engine;
at least one drive sprocket mounted on the drive axle and being rotatable therewith, each of the at least one drive sprocket comprising:
  a wheel mounted on the drive axle, the wheel having a wheel radius; and
  a plurality of teeth being distributed on a periphery of the wheel;
a brake disk mounted on the drive axle, the brake disk being coaxial and rotatable with the drive axle, a diameter of a cylinder circumscribing the entirety of the brake disk being greater than a diameter of a cylinder circumscribing the entirety of the wheel of the at least one drive sprocket; and
a drive track connected to the frame by the suspension assembly, the plurality of teeth of the at least one drive sprocket engaging the drive track for driving the drive track about the suspension assembly to propel the snowmobile, the drive track comprising:
  an endless belt made of flexible material, the endless belt having an inner surface and an outer surface, the belt defining a longitudinal direction and a lateral direction; and
  a plurality of external lugs projecting outwards from the outer surface of the belt, the plurality of external lugs being formed with the endless belt, each of the plurality of external lugs having a height in a direction normal to the outer surface, the wheel radius being smaller than the height of at least some of the plurality of external lugs, a width of the endless belt being greater than a width of each of the plurality of external lugs.

2. The snowmobile of claim 1 further comprising:
a plurality of internal lugs projecting inwards from the inner surface of the belt, each of the plurality of teeth being adapted to selectively engage at least some of the plurality of internal lugs.

3. The snowmobile of claim 2, wherein the wheel of the at least one drive sprocket has a diameter such that the plurality of teeth engages at least three of the plurality of internal lugs.

4. The snowmobile of claim 2, wherein the plurality of teeth comprises:

a plurality of axial teeth being distributed on a periphery of an axial surface of the wheel and extending therefrom in an axial direction of the drive axle.

5. The snowmobile of claim 4, wherein the height of the at least some of the plurality of external lugs is greater than a radius of a cylinder circumscribing the plurality of axial teeth.

6. The snowmobile of claim 1, wherein:
the plurality of teeth comprises a plurality of radial teeth distributed on a perimetrical surface of the wheel and extending radially therefrom; and
the drive track comprises a plurality of belt apertures extending through the belt from the inner surface to the outer surface,
each of the plurality of radial teeth selectively engages a corresponding belt aperture when a surface of the wheel adjacent to the corresponding radial tooth is in contact with the inner surface adjacent the corresponding belt aperture.

7. The snowmobile of claim 1, wherein the diameter of the brake disk is greater than a diameter of a cylinder circumscribing the entirety of the at least one drive sprocket.

8. The snowmobile of claim 1, further comprising:
a transverse jack operatively connected to the engine; and
a reduction drive operatively connecting the transverse jackshaft to the drive axle, the transverse jackshaft operatively connecting the engine to the reduction drive.

9. A snowmobile comprising:
a frame comprising a tunnel,
the tunnel comprising a left side wall defining a left opening and a right side wall defining a right opening;
a suspension assembly connected to the frame;
an engine connected to the frame;
a drive axle operatively connected to the engine, the drive axle extending through the left opening and the right opening;
at least one drive sprocket mounted on the drive axle and being rotatable therewith, the drive axle and the at least one drive sprocket mounted thereon being rotatable about a drive sprocket axis, each of the at least one drive sprocket comprising:
a wheel mounted on the drive axle, the wheel having a wheel radius; and
a plurality of teeth being distributed on a periphery of the wheel;
a drive track connected to the frame by the suspension assembly, the at least one drive sprocket driving the drive track about the suspension assembly to propel the snowmobile, the drive track comprising:
an endless belt made of flexible material, the endless belt having an inner surface and an outer surface, the belt defining a longitudinal direction and a lateral direction; and
a plurality of external lugs projecting outwards from the outer surface of the belt, the plurality of external lugs being formed with the endless belt, each of the plurality of external lugs having a height in a direction normal to the outer surface, the wheel radius being smaller than the height of at least some of the plurality of external lugs, a width of the endless belt being greater than a width of each of the plurality of external lugs;
a left footrest extending laterally outwardly from the left side wall, a portion of the left footrest being disposed longitudinally forwardly of the drive sprocket axis, a projection of the left footrest on the left side wall being disposed in part within a perimeter of the left opening; and
a right footrest extending laterally outwardly from the right side wall, a portion of the right footrest being disposed longitudinally forwardly of the drive sprocket axis, a projection of the right footrest on the right side wall being disposed in part within a perimeter of the right opening.

10. A snowmobile comprising:
a frame;
a rear suspension assembly connected to the frame, the rear suspension assembly comprising an upper idler wheel rotatable about an upper idler wheel rotation axis;
an engine connected to the frame;
a drive axle operatively connected to the engine;
at least one drive sprocket mounted on the drive axle and being rotatable therewith, the drive axle and the at least one drive sprocket mounted thereon being rotatable about a drive sprocket axis, each of the at least one drive sprocket comprising:
a wheel mounted on the drive axle, the wheel having a wheel radius; and
a plurality of teeth being distributed on a periphery of the wheel;
a drive track connected to the frame by the rear suspension assembly, the at least one drive sprocket driving the drive track about the rear suspension assembly to propel the snowmobile, the drive track comprising:
an endless belt made of flexible material, the endless belt having an inner surface and an outer surface, the belt defining a longitudinal direction and a lateral direction; and
a plurality of external lugs projecting outwards from the outer surface of the belt, the plurality of external lugs being formed with the endless belt, each of the plurality of external lugs having a height in a direction normal to the outer surface, the wheel radius being smaller than the height of at least some of the plurality of external lugs, a width of the endless belt being greater than a width of each of the plurality of external lugs;
a left ski assembly;
a right ski assembly;
a left front suspension assembly connecting the left ski assembly to the frame; and
a right front suspension assembly connecting the right ski assembly to the frame,
each of the left and right front suspension assemblies comprising an arm having a front member and a rear member, respective inner ends of each of the front and rear members being pivotally connected to the frame about an arm pivot axis,
for each of the left and right front suspension assemblies:
an intersection of the arm pivot axis with a plane containing the upper idler wheel rotation axis and the drive sprocket axis being disposed longitudinally between the inner ends of the front member and the rear member.

11. The snowmobile of claim 10, wherein:
the arm is a lower arm; and
each of the left and right front suspension assemblies further comprises an upper arm.

12. A drive sprocket and drive track assembly of a tracked vehicle, the assembly comprising:

a drive track comprising:

an endless belt made of flexible material, the endless belt having an inner surface and an outer surface, the belt defining a longitudinal direction and a lateral direction; and a plurality of external lugs projecting outwards from the outer surface of the belt, the plurality of external lugs being formed with the endless belt, each of the plurality of external lugs having a height in a direction normal to the outer surface, a width of the endless belt being greater than a width of each of the plurality of external lugs, the plurality of external lugs having an external lug pitch; and a plurality of internal lugs projecting inwards from the inner surface of the belt, the plurality of internal lugs having an internal lug pitch;

and at least one drive sprocket, each of the at least one drive sprocket comprising:

a wheel for mounting on a drive axle, the wheel having a wheel radius, the radius being smaller than the height of at least some of the plurality of external lugs; and a plurality of teeth being distributed on a periphery of the wheel, each of the plurality of teeth being adapted to engage at least some of the plurality of internal lugs the plurality of teeth having a circumferential sprocket pitch, the external lug pitch, the internal lug pitch and the circumferential sprocket pitch being equal.

13. The assembly of claim 12, wherein the sprocket has a diameter such that the plurality of teeth engages at least three of the plurality of internal lugs.

14. The assembly of claim 12, wherein:

the plurality of teeth comprises a plurality of axial teeth being distributed on a periphery of an axial surface of the wheel and extending therefrom in an axial direction of the drive axle; and the height of the at least some of the plurality of external lugs is greater than a radius of a cylinder circumscribing the plurality of axial teeth.

15. The assembly of claim 12, further comprising a brake disk mounted on the drive axle, the brake disk being coaxial and rotatable with the drive axle, a diameter of a cylinder circumscribing the entirety of the brake disk being greater than a diameter of a cylinder circumscribing the entirety of the wheel of the at least one drive sprocket.

16. The assembly of claim 15, wherein the diameter of the brake disk is greater than a diameter of a cylinder circumscribing the entirety of the at least one drive sprocket.

17. The assembly of claim 12, wherein the height of each of the plurality of external lugs being greater than the external lug pitch.

* * * * *